(12) United States Patent
Iwayama

(10) Patent No.: US 12,149,654 B2
(45) Date of Patent: Nov. 19, 2024

(54) CONTROL METHOD, STORAGE MEDIUM, AND INFORMATION PROCESSING APPARATUS

(71) Applicant: CANON KABUSHIKI KAISHA, Tokyo (JP)

(72) Inventor: Hiroyoshi Iwayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 17/947,220

(22) Filed: Sep. 19, 2022

(65) Prior Publication Data

US 2023/0100389 A1 Mar. 30, 2023

(30) Foreign Application Priority Data

Sep. 30, 2021 (JP) .................... 2021-161331

(51) Int. Cl.
*H04W 88/02* (2009.01)
*G06F 9/4401* (2018.01)
*H04M 1/05* (2006.01)
*H04M 1/72454* (2021.01)
*H04N 1/32* (2006.01)

(52) U.S. Cl.
CPC ...... *H04M 1/72454* (2021.01); *G06F 9/4406* (2013.01); *H04N 1/32545* (2013.01)

(58) Field of Classification Search
CPC ............. H04M 1/72454; G06F 9/4406; H04N 1/32545
See application file for complete search history.

(56) References Cited

U.S. PATENT DOCUMENTS

2016/0266849 A1* 9/2016 Honda .................. G06F 3/1229
2017/0286134 A1* 10/2017 Sumiuchi ........... H04N 1/00307
2020/0401758 A1* 12/2020 Li .......................... G06F 3/0481

FOREIGN PATENT DOCUMENTS

JP    2019-036315 A    3/2019

* cited by examiner

*Primary Examiner* — Moustapha Diaby
(74) *Attorney, Agent, or Firm* — Venable LLP

(57) ABSTRACT

An object of the present disclosure is to provide a UI display that secures the visual recognizability of a user even in a case where the number of characters to be displayed is large. One embodiment of the present invention is a control method of an information processing apparatus, the method including: a specification step of specifying notification contents; and a notification step of performing, based on at least one of a number of line feeds included in the specified notification contents and a number of characters included in the specified notification contents, processing for notifying the specified notification contents by a predetermined notification method, wherein the predetermined notification method is a notification method of displaying, after a first portion of the specified notification contents is displayed and the display of the first portion is terminated, a second portion different from the first portion of the specified notification contents.

20 Claims, 14 Drawing Sheets

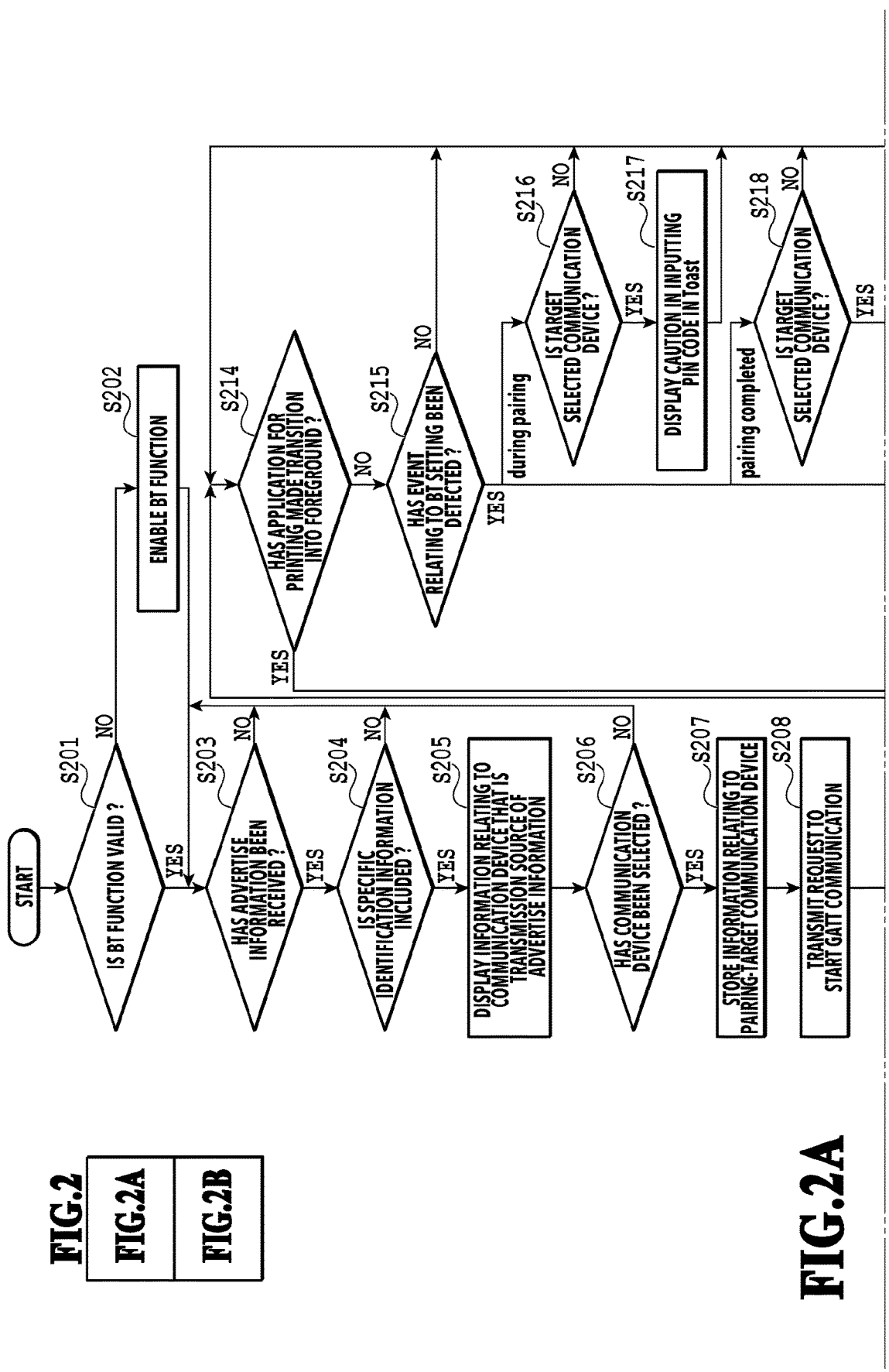

CONTROL METHOD, STORAGE MEDIUM, AND INFORMATION PROCESSING APPARATUS

BACKGROUND OF THE INVENTION

Field of the Invention

The present disclosure relates to a technique for displaying a user interface (UI).

Description of the Related Art

As a UI display within a smartphone, a UI display called Toast display exists. The area in which the Toast display is displayed is a notification area that is displayed on the frontmost surface on the smartphone screen. The Toast display is also referred to simply as Toast.

Toast disappears automatically in a case where a predetermined time elapses. Further, even while Toast is being displayed, by operating an area other than Toast, it is possible to perform an operation for a screen that is displayed behind Toast, and therefore, it is possible to suppress the hinderance of a user operation to a minimum. Further, the function to display Toast is the function of the OS, and therefore, in a case where Toast is displayed, a request to display Toast is transmitted to the OS along with contents of a message to be included in Toast. Due to this, Toast display is implemented.

SUMMARY OF THE INVENTION

As described in Japanese Patent Laid-Open No. 2019-036315, it is possible for Toast display to provide an excellent user experience (UX) that is not provided by another display UI, such as Dialog display. However, on the other hand, because of the characteristic that Toast display disappears automatically after a predetermined time elapses, and therefore, in a case where the number of characters desired to be displayed in Toast is large, there is a possibility that visual recognizability deteriorates, such as that the Toast display disappears before a user completes reading of the characters.

Consequently, an object of one embodiment of the present invention is to provide UI display that secures the visual recognizability of a user even in a case where the number of characters to be displayed is large.

One embodiment of the present invention is a control method of an information processing apparatus, the method including: a specification step of specifying notification contents; and a notification step of performing, based on at least one of a number of line feeds included in the specified notification contents and a number of characters included in the specified notification contents, processing for notifying the specified notification contents by a predetermined notification method, wherein the predetermined notification method is a notification method of displaying, after a first portion of the specified notification contents is displayed and the display of the first portion is terminated, a second portion different from the first portion of the specified notification contents.

Further features of the present invention will become apparent from the following description of exemplary embodiments with reference to the attached drawings.

BRIEF DESCRIPTION OF THE DRAWINGS

FIG. 2 is a diagram showing the relationship of FIG. 2A and FIG. 2B;

FIG. 2A and FIG. 2B indicates a flowchart of pairing processing that is performed by an information processing apparatus;

DESCRIPTION OF THE EMBODIMENTS

In the following, embodiments of the present disclosure are explained in detail. The following embodiments are merely exemplary for explaining the technique of the present disclosure and not intended to limit the present invention only to the following contents. Further, it is possible to modify the present invention in a variety of ways as long as the modification does not deviate from its gist.

First Embodiment

<Configuration of System>

In the following, a communication system in the present embodiment is explained. This communication system has an information processing apparatus and a communication device. In the following embodiment, a smartphone is supposed as the information processing apparatus, but the information processing apparatus is not limited to the smartphone. As the information processing apparatus, it is possible to adopt various units, such as a mobile terminal, note PC, tablet terminal, PDA (Personal Digital Assistant), and digital camera.

Further, in the following embodiment, as the communication device, a printer is supposed, but the communication device is not limited to the printer. It may also be possible to adopt various kinds of device as long as the device is capable of performing wireless communication with the information processing apparatus. For example, as the printer, it is possible to adopt an ink jet printer, full-color laser beam printer, monochrome printer and the like. Further, not limited to the printer, it is also possible to adopt a copy machine and facsimile machine, mobile terminal, smartphone, note PC, tablet terminal, PDA, digital camera, music reproduction device, television and the like. Furthermore, it is also possible to adopt a multi-function peripheral having a plurality of functions, such as the copy function, the FAX function, and the print function.

Figure 1:
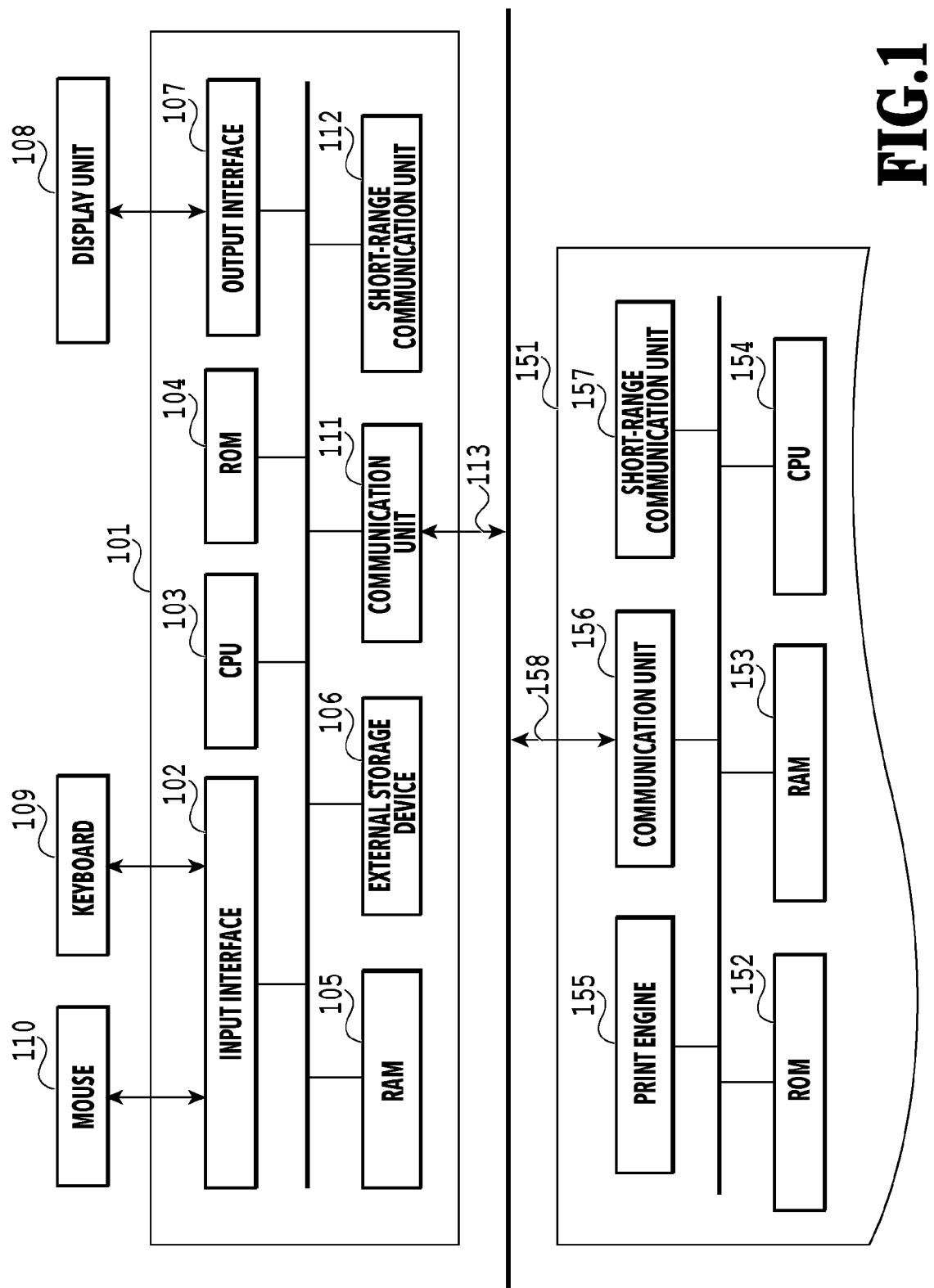
FIG. 1 is a block diagram of a communication system.

First, the configuration of the communication system in the present embodiment is explained with reference to FIG. 1. As shown in FIG. 1, the communication system has an information processing apparatus 101 and a communication device 151.

The information processing apparatus 101 has an input interface 102, a CPU 103, a ROM 104, a RAM 105, an external storage device 106, an output interface 107, a communication unit 111, and a short-range communication unit 112. Further, a display unit 108 is connected to the information processing apparatus 101. In FIG. 1, the aspect is shown in which the information processing apparatus 101 and the display unit 108 are separate, but an aspect may be accepted in which the information processing apparatus 101 has the display unit 108.

The input interface 102 is an interface for receiving a data input and operation instructions from a user by a mouse 110 or a keyboard 109 being operated.

The CPU 103 is a system control unit and controls each unit of the information processing apparatus 101 and controls the entire operation of the information processing apparatus 101.

In the ROM 104, fixed data executed by the CPU 103, such as control programs, data tables, and an incorporated operating system (in the following, called OS) program, is stored. In the present embodiment, each control program stored in the ROM 104 performs software execution control, such as scheduling, task switch, and interrupt processing, under the management of the incorporated OS stored in the ROM 104. In the present embodiment, it is assumed that the OS of the information processing apparatus 101 is Android (registered trademark). However, the aspect is not limited to this and for example, the OS may be another OS, such as iOS (registered trademark), macOS (registered trademark), and Linux (registered trademark).

In the present embodiment, the OS of the information processing apparatus 101 has a notification function for displaying various kinds of information on the display unit 108 and notifying a user of the various kinds of information. In the present embodiment, it is assumed that the notification function includes the Toast function. Each notification function is performed by the OS with the application program requesting the OS for a notification by each notification function. It is possible for the application program to arbitrarily determine the contents notified (displayed in the notification area) by each notification function. Then, at the time of the OS being requested for the notification by each notification function, the OS is also notified of the contents.

The Toast function is a function to display a notification area called Toast. Toast is a notification area that disappears in a case where a predetermined time elapses after it is displayed in a pop-up manner. The size of Toast is not limited, but it is preferable for the size to be a size corresponding to a partial area on the display unit so that the screen of an application program, which is displayed behind Toast, is not covered completely. Even in a case where a user operation is received for Toast, processing corresponding to the notification area is not performed particularly. The processing corresponding to the notification area is, for example, processing to activate the application program having requested a notification, processing based on a message notified by the notification area, and processing corresponding to a button displayed in the notification area. Then, even in a state where Toast is being displayed, it is possible for the screen of an application program, which is displayed behind Toast, to receive a user operation. Further, the notification by the Toast function may be performed even in a state where the application program having requested the notification is not running in the foreground (running in the background) and another application program is running in the foreground.

In the notification function of the OS, a function other than the Toast function may be included. Specifically, for example, a Notification function, a SnackBar function, and a Dialog function may be included.

The Notification function is a function to display a notification area called Notification. Notification is a notification that is displayed by a Push notification and the like and is a notification area that disappears by a notification confirmation operation being performed by a user. Then, in a case where a user operation is received for Notification, processing corresponding to the notification area is performed. The notification by the Notification function may be performed even in a state where the application program having requested the notification is not running in the foreground (running in the background) and another application program is running in the foreground.

The SnackBar function is a function to display a notification area called SnackBar. SnackBar is a notification area that disappears in a case where a predetermined time elapses after it is displayed. Then, it is possible for an application program having requested the notification by the SnackBar function to arbitrarily set whether or not to perform processing corresponding to the notification area in a case where a user operation is received for SnackBar. The notification by the SnackBar function cannot be performed in a state where the application program having requested the notification is not running in the foreground (running in the background) and another application program is running in the foreground. That is, the notification by the SnackBar function can be performed only in a state where the application program having requested the notification by the SnackBar function is running in the foreground.

The Dialog function is a function to display a notification area called Dialog. Dialog is a notification area that disappears by a notification confirmation operation is performed by a user after it is displayed. Specifically, there is a case where a button is displayed in Dialog and on a condition that the displayed button is operated by a user, Dialog disappears. Then, processing corresponding to the button whose input has been received is performed thereafter by the application program having requested the notification by the Dialog function. The notification by the Dialog function cannot be performed in a state where the application program having requested the notification is not running in the foreground (running in the background) and another application program is running in the foreground. That is, the notification by the Dialog function can be performed only in a state where the application program having requested the notification by the Dialog function is running in the foreground.

The RAM 105 includes an SRAM (Static Random Access Memory) or the like that requires a backup power source. In the RAM 105, data is stored by a primary battery for data backup, not shown schematically, and therefore, it is possible to store important data, such as program control variables, without volatilization. A memory area storing setting information on the information processing apparatus 101, management data of the information processing apparatus 101, and the like is also provided in the RAM 105. Further, the RAM 105 is also used as a main memory and a work memory of the CPU 103.

In the external storage device 106, application programs providing the printing execution function, print job creation programs creating a print job that the communication device 151 can interpret, and the like are stored. Further, in the external storage device 106, various programs, such as information transmission/reception control programs performing transmission and reception with the communication device 151 connected via the communication unit 111, various kinds of information used by these programs, and the like area stored.

The output interface 107 is an interface for the display unit 108 to display contents based on data, perform notification of the state of the information processing apparatus 101, and so on.

The display unit 108 includes an LED (light-emitting diode), an LCD (liquid crystal display) or the like and produces display based on data and performs notification of the state of the information processing apparatus 101. It may also be possible to receive an input from a user via the display unit 108 by installing an operation unit, such as a numerical value input key, mode setting key, determination key, cancel key, and power key, on the display unit 108.

The communication unit 111 is a component for performing data communication by connecting to the communication device 151 or a device, such as an external access point (not shown schematically), existing outside the information processing apparatus 101 and the communication device 151. For example, it is possible for the communication unit 111 to connect to an access point (not shown schematically) within the communication device 151. By the communication unit 111 and the access point within the communication device 151 being connected to each other, it is made possible for the information processing apparatus 101 and the communication device 151 to communicate with each other. It may also be possible for the communication unit 111 to communicate directly with the communication device 151 by wireless communication or communicate with the communication device 151 via an external device existing outside the information processing apparatus 101 and the communication device 151. Further, the external device includes an external access point and a device capable of relaying communication other than the access point. As the wireless communication method, mention is made of, for example, Wi-Fi (Wireless Fidelity) (registered trademark), Bluetooth (registered trademark) and the like. Further, as the external access point, mention is made of, for example, a device, such as a wireless LAN router. In the present embodiment, the method in which the information processing apparatus 101 and the communication device 151 are connected directly without the interposition of the external access point is called the direct connection method. Further, the method in which the information processing apparatus 101 and the communication device 151 are connected via the external access point is called the infrastructure connection method.

The short-range communication unit 112 is a component for performing data communication by wirelessly connecting with a device, such as the communication device 151, within a short range and performs communication by a communication method different from the communication unit 111. It is possible for the short-range communication unit 112 to connect with a short-range communication unit 157 within the communication device 151. As the communication method, mention is made of, for example, Bluetooth (registered trademark), WiFi Aware and the like. In the present embodiment, it is assumed that the short-range communication unit 112 is capable of performing communication by Bluetooth Low Energy (BLE) and Bluetooth Classic as the Bluetooth function.

In the present embodiment, it is assumed that the communication unit 111 is capable of performing communication faster than the short-range communication unit 112. Further, it is assumed that the range over which the communication unit 111 can perform communication is longer than the range over which the short-range communication unit 112 can perform communication.

The communication device 151 has a ROM 152, a RAM 153, a CPU 154, a print engine 155, a communication unit 156, and the short-range communication unit 157.

The communication unit 156 has an access point for connecting with a device, such as the information processing apparatus 101, as an access point inside the communication device 151. It is possible for this access point to connect to the communication unit 111 of the information processing apparatus 101. It may also be possible for the communication unit 156 to directly communicate with the information processing apparatus 101 by wireless communication or communicate with the information processing apparatus 101 via an external access point. As the communication method, mention is made of, for example, Wi-Fi (registered trademark), Bluetooth (registered trademark) and the like. Further, it may also be possible for the communication unit 156 to have hardware that functions as an access point or operate as an access point by software for causing the communication unit 156 to function as an access point.

The short-range communication unit 157 is a component for performing data communication by wirelessly connecting with a device within a short range, such as the information processing apparatus 101, and is capable of connecting with, for example, the short-range communication unit 112 within the information processing apparatus 101. As the communication method, mention is made of, for example, Bluetooth, WiFi Aware and the like. In the present embodiment, it is assumed that the short-range communication unit 157 is capable of performing communication by BLE and Bluetooth Classic as the Bluetooth function.

In the present embodiment, it is assumed that the communication unit 156 is capable of performing communication faster than the short-range communication unit 157. Further, it is assumed that the range over which the communication unit 156 can perform communication is longer than the range over which the short-range communication unit 157 can perform communication.

The RAM 153 includes an SRAM or the like that requires a backup power source. In the RAM 153, data is stored by a primary battery for data backup, not shown schematically, and therefore, it is possible to store important data, such as program control variables, without volatilization. Further, a memory area storing setting information on the communication device 151, management data of the communication device 151, and the like is also provided in the RAM 153. Furthermore, the RAM 153 is also used as a main memory and a work memory of the CPU 154 and functions as a reception buffer for temporarily storing printing information received from the information processing apparatus 101 and the like and in the RAM 153, various kinds of information are stored.

In the ROM 152, fixed data executed by the CPU 154, such as control programs, data tables, and an OS program, is stored. In the present embodiment, each control program stored in the ROM 152 performs software execution control, such as scheduling, task switch, and interrupt processing, under the management of the incorporated OS stored in the ROM 152.

The CPU 154 is a system control unit and controls each unit of the communication device 151 and controls the entire operation of the communication device 151.

The print engine 155 performs image formation processing to form an image on a printing medium by attaching a printing material, such as ink, onto the printing medium, such paper, based on the information stored in the RAM 153 and the print job received from the information processing apparatus 101 or the like, and outputs the print results. The print job is a job for causing the communication device 151 to perform image formation processing. In a case where image formation processing based on a print job is performed, high-speed communication with a large amount of data is required by the print job that is transmitted from the information processing apparatus 101 or the like, and therefore, the print job is received via the communication unit 156 capable of communication higher than the short-range communication unit 157.

To the communication device 151, a memory, such as an external HDD and an SD card, may be attached as an optional device and the information that is stored in the communication device 151 may be stored in the attached memory.

Further, for the communication device of the present embodiment, a connection mode is set by connection setting processing and by the connection configuration based on the set connection mode, the communication device performs communication with the information processing apparatus. For example, in a case where the communication device of the present embodiment performs communication by the infrastructure connection, the infrastructure connection mode is set as the connection mode and in a case where the communication device performs communication by the direct connection, the direct connection mode is set as the connection mode.

Here, as an example, the sharing of the processing between the information processing apparatus 101 and the communication device 151 is shown as described above, but the sharing aspect is not limited particularly to that shown here and another aspect may be accepted.

Further, in the present embodiment, explanation is given on the assumption that the short-range communication unit 112 and the short-range communication unit 157 perform communication by BLE. In the present embodiment, the short-range communication unit 157 functions as an advertiser (or slave) that broadcasts advertise information, to be described later, and the short-range communication unit 112 functions as a scanner (or master) that receives advertise information. Further, explanation is given on the assumption that the communication unit 111 and the communication unit 156 perform communication by wireless LAN (Wi-Fi). Here, by using FIG. 8. processing of transmission of advertise information in conformity with the BLE standard and reception of a BLE connection request is explained. In the present embodiment, as described above, the short-range communication unit 157 operates as a slave device, and therefore, it is assumed that the short-range communication unit 157 performs the above-described processing.

Figure 8:
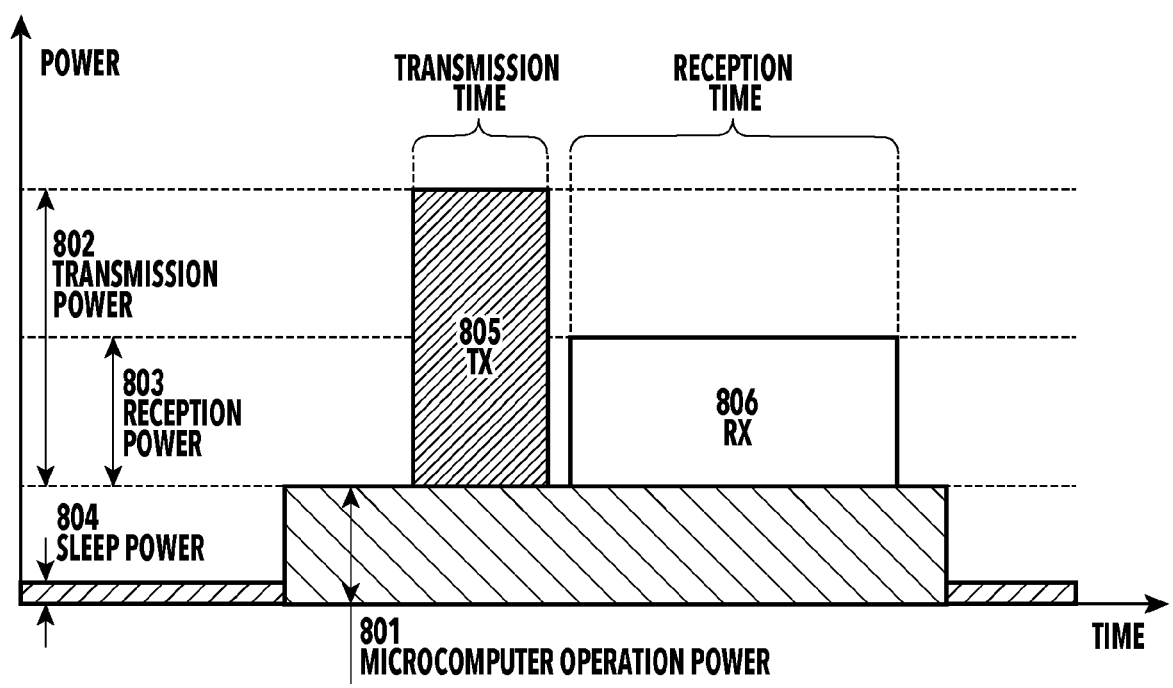
FIG. 8 is a diagram for explaining broadcast of advertise information and processing to receive connection request information.

The short-range communication unit 157 performs communication by dividing a 2.4 GHz frequency band into 40 channels (0 to 39 ch) in accordance with the BLE communication method. The short-range communication unit 157 utilizes the 37th to 39th channels of the 40 channels for transmission of advertise information and reception of a BLE connection request and utilizes the 0th to 36th channels for data communication (GATT communication and the like) after the BLE connection. In FIG. 8, the vertical axis represents power consumption of the short-range communication unit 157 and the horizontal axis represents time and the power consumption at the time of transmitting advertise information by utilizing one channel is indicated for each piece of processing. Tx 805 indicates the total power consumption in transmission processing, which is processing to broadcast advertise information, and Rx 806 indicates the total power consumption in reception processing, which is processing to enable in advance a receiver for receiving a BLE connection request. Transmission power 802 indicates instantaneous power consumption by the transmission processing. Further, reception power 803 indicates instantaneous power consumption by the reception processing. Furthermore, microcomputer operation power 801 indicates instantaneous power consumption in a case where a microcomputer within the short-range communication unit 157 is operating. The reason the microcomputer is operating before, after, and during Tx 805 and Rx 806 is that it is necessary for the microcomputer to be activated in advance in order to perform or terminate the transmission and reception processing. Further, in a case where transmission of advertise information is performed by using a plurality of channels, the power consumption increases in accordance with the number of channels that perform transmission of advertise information. Furthermore, while the microcomputer is not operating and the short-range communication unit 157 is in the power-saving state, sleep power 804 is the instantaneous power consumption of the short-range communication unit 157. As described above, the short-range communication unit 157 waits for a BLE connection request being transmitted from the information processing apparatus 101 by performing, after performing the transmission processing by using a predetermined channel, the reception processing for a predetermined time by using the same channel. In a case of receiving a BLE connection request from the information processing apparatus 101, the short-range communication unit 157 establishes a BLE connection and performs GATT communication with the information processing apparatus 101.

Figure 9:
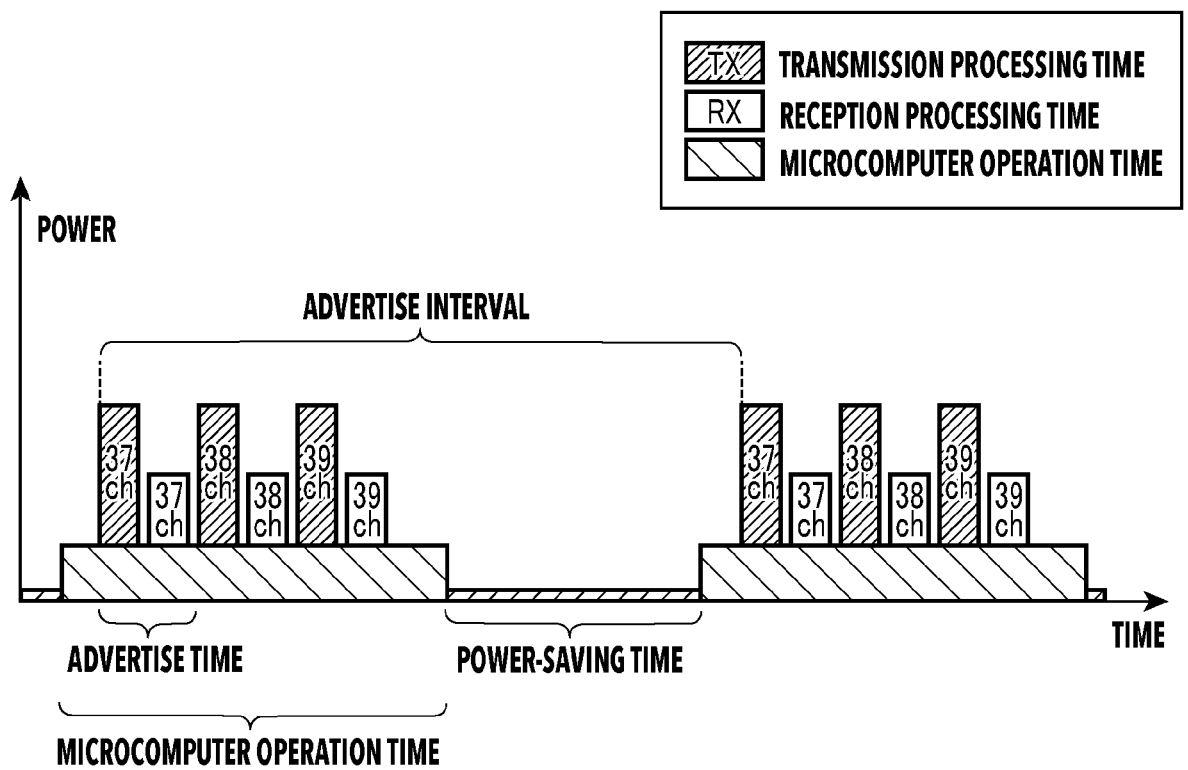
FIG. 9 is a diagram for explaining advertise in BLE.

Further, as shown in FIG. 9, after repeating the transmission processing of advertise information and the reception processing three times for each channel, the short-range communication unit 157 terminates the operation of the microcomputer and enters the power-saving state for a predetermined time. In the following, the combination of the transmission processing of advertise information and the reception processing by a predetermined channel is called "advertise". Further, the time interval at which advertise information is transmitted by a predetermined channel is called "advertise interval". The number of times of advertise that is repeated until the power-saving state is brought about after performing advertise for the first time can be changed arbitrarily provided that the number of times of advertise is three or less.

Figure 10:
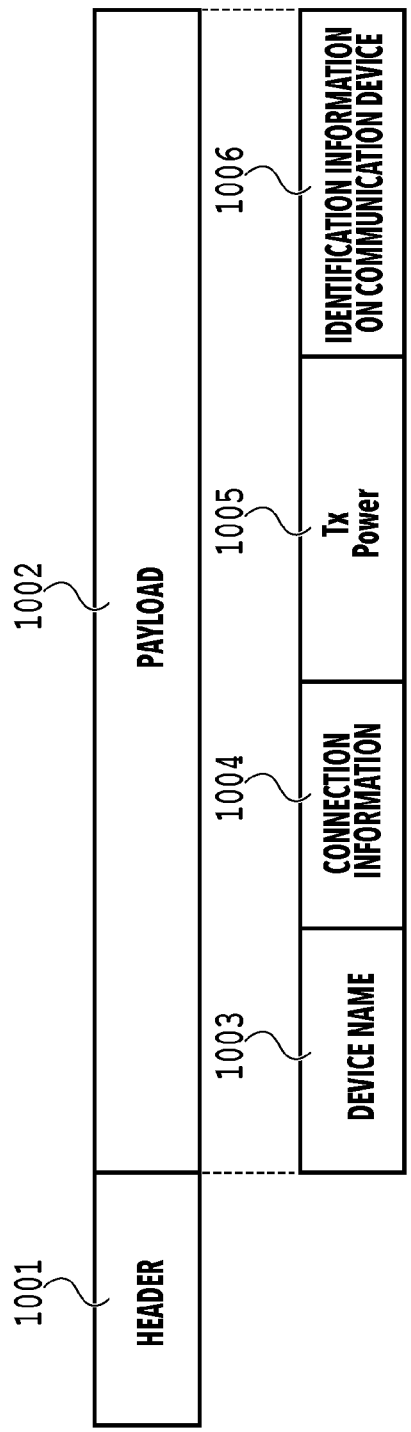
FIG. 10 is a diagram showing a structure of advertise information.

FIG. 10 shows an example of the structure of advertise information that is broadcast to the periphery of the communication device 151 by the short-range communication unit 157.

In a case where power supply is started, the short-range communication unit 157 performs initialization processing and enters an advertising state. In a case of entering the advertising state, the short-range communication unit 157 broadcasts advertise information periodically to the periphery based on the advertise interval. The advertise information is a signal including basic header information (identification information for identifying a device that transmits the advertise information, and the like) and includes a header 1001 and a payload 1002. It is possible for the information processing apparatus 101 to recognize the presence of the communication device 151 by receiving the advertise information. Further, it is possible for the information processing apparatus 101 to establish the BLE connection with the communication device 151 by transmitting a BLE connection request to the communication device 151. The header 1001 is an area that stores information on the type of advertise information and the size of the payload 1002, and the like. The payload 1002 stores information, such as a device name 1003 as identification information, mounted profile information, connection information 1004 for establishing the BLE connection with the communication device 151, and transmission power (Tx Power) 1005 of advertise information. It may also be possible to include identification information 1006 on the communication device in the advertise information. The identification information 1006 on the communication device corresponds to a MAC address of the communication device, service information on the communication device, SSID of the access point within the communication device, a password and the like.

In the present embodiment, it is assumed that in a case where the power source of the communication device 151 is turned on, the short-range communication unit 157 enters the advertising state and starts transmission of advertise information. However, the timing at which the short-range communication unit 157 starts transmission of advertise information is not limited to the above-described aspect and the timing may be timing at which, for example, a predetermined operation for enabling the BLE function is performed, or the like.

For example, the aspect may be one in which first, the short-range communication unit 157 transmits first advertise information and in a case where a response to the first advertise information is received from the information processing apparatus 101, the short-range communication unit 157 transmits second advertise information whose contents are different from those of the first advertise information. For example, it is assumed that the first advertise information includes information relating to the transmission power of the advertise information, identification information on the short-range communication unit 157, and the like. Then, it is assumed that the second advertise information includes identification information on the communication device 151, information relating to the function and hardware of the communication device 151, and the like. In a case of the aspect such as this, for example, the application for printing is designed as handling the second advertise information. Consequently, it is assumed that the advertise information handled by the application for printing in the following explanation is the second advertise information.

Further, in the present embodiment, authentication is performed between the information processing apparatus 101 and the communication device 151 and pairing processing therebetween for performing reading and writing of data by the GATT (Generic Attribute Profile) communication is performed. The GATT is a profile governing reading and writing (transmission and reception) of information in conformity with the BLE standard. Then, the GATT communication is communication in which the information processing apparatus 101 takes on the role of a GATT client and the communication device 151 takes on the role of a GATT server and by a GATT-based profile, reading and writing of information is performed from the information processing apparatus 101 to the communication device 151. The configuration is designed so that in the state where pairing is not performed between the information processing apparatus 101 and the communication device 151, the communication device 151 does not allow reading and writing of information by the GATT communication. By doing so, for example, it is possible to suppress the information stored in the communication device 151 from being obtained carelessly by the information processing apparatus 101 for which pairing with the communication device 151 has not been performed by the information processing apparatus 101 and the communication device 151 performing communication, between which pairing processing has not been performed. In the present embodiment, it is assumed that there are GATT communication that is allowed in the state where pairing is not performed and GATT communication that is not allowed in the state where pairing is not performed. As regards information whose confidentiality is low, it is possible to improve convenience of communication by making it possible to perform communication by the GATT communication that is allowed in the state where pairing is not performed. On the other hand, as regards information whose confidentiality is high, it is possible to improve security of communication by making it possible to perform communication only by the GATT communication that is not allowed in the state where pairing is not performed.

In the present embodiment, it is assumed that the information processing apparatus 101 stores a predetermined application in the ROM 104, the external storage device 106 or the like. The predetermined application is, for example, an application program for printing for transmitting a print job to cause image data, document data and the like within the information processing apparatus 101 to be printed to the communication device 151. The application having the function such as this is called an "application for printing" in the following. The application for printing may have another function other than the print function. For example, in a case where the communication device 151 has the scan function, the application for printing may have the function to cause the communication device 151 to scan a set document, the function to perform another setting of the communication device 151, the function to confirm the state of the communication device 151, and the like. That is, the application for printing may have the function to transmit a scan job and a setting job to the communication device 151 other than the print job. Further, the predetermined application is not limited to the application for printing and may be an application program having a function other than the print function.

There is a case where the information processing apparatus 101 communicates with the communication device 151 by, for example, BLE in order to use the function of the application for printing. Specifically, for example, in a case of performing processing by the print function, the information processing apparatus 101 first performs transmission and reception of WiFi communication connection information by the BLE communication and then transmits the print job to the communication device 151 by the WiFi communication. Because of this, in order to utilize the function of the application for printing, it is preferable for the information processing apparatus 101 to perform pairing processing in BLE and bring about the state where it is possible to perform the BLE communication with the communication device 151. Consequently, in the present embodiment, it is assumed that the application for printing also has the function to perform pairing processing between the information processing apparatus 101 and the communication device 151. Then, in the following, an aspect is explained in which pairing processing is performed via the application for printing.

Figure 3:
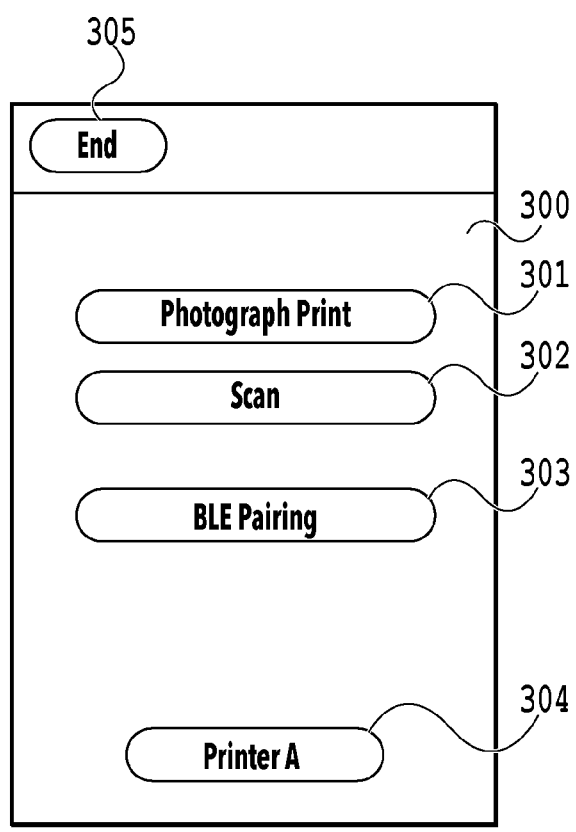
FIG. 3 is a screen that is displayed in a case where an application for printing is activated.

FIG. 3 shows an example of a screen that is displayed on the display unit 108 at the time of activation of the application for printing. Via an activation screen 300, it is possible for a user to utilize the function of the communication device, such as the print function of a desired image and the setting function of the communication device. In a case of detecting pressing down of a Photograph print button 301, the CPU 103 of the information processing apparatus 101 causes the communication device 151 to display a screen for performing printing. Further, in a case of detecting pressing down of a Scan button 302, the CPU 103 of the information processing apparatus 101 causes the communication device 151 to display a screen for performing scan processing, which is processing to create image data by reading a document. Furthermore, in a case of detecting pressing down of a BLE pairing button 303, the CPU 103 of the information processing apparatus 101 starts pairing processing.

It is assumed that the information processing apparatus 101 of the present embodiment has an application for setting. The application for setting is an application program for performing setting relating to the function that is performed by the OS. The application for setting is, for example, an application program that is installed together with the OS in the series of processing to install the OS in the information processing apparatus 101, installed in advance in the information processing apparatus 101 together with the OS at the time of arrival of the information processing apparatus 101, and so on. In a case of performing pairing with the communication device 151, the information processing apparatus 101 of the present embodiment receives an input from a user for pairing for a Bluetooth setting screen (in the following, called "BT setting screen") that is displayed by the application for setting. Specifically, the information processing apparatus 101 receives an input from a user for pairing for the BT setting screen that is displayed by the application for setting. The reason is that, for example, depending on the kind of OS mounted on the information processing apparatus 101 or the model type of the information processing apparatus 101, it is not possible to perform pairing processing on a screen that is displayed by a program other than the application for setting, that is, on the screen that is displayed by the application for printing. Because of this, the information processing apparatus 101 utilizes the BT setting screen that is displayed by the application for setting also at the time of performing pairing processing via the application for printing. In the present embodiment, an aspect is explained in which it is possible to improve usability of pairing processing that is performed via both the screen that is displayed by the application for printing and the screen that is displayed by a program other than the application for printing (here, application for setting).

Figure 2B:
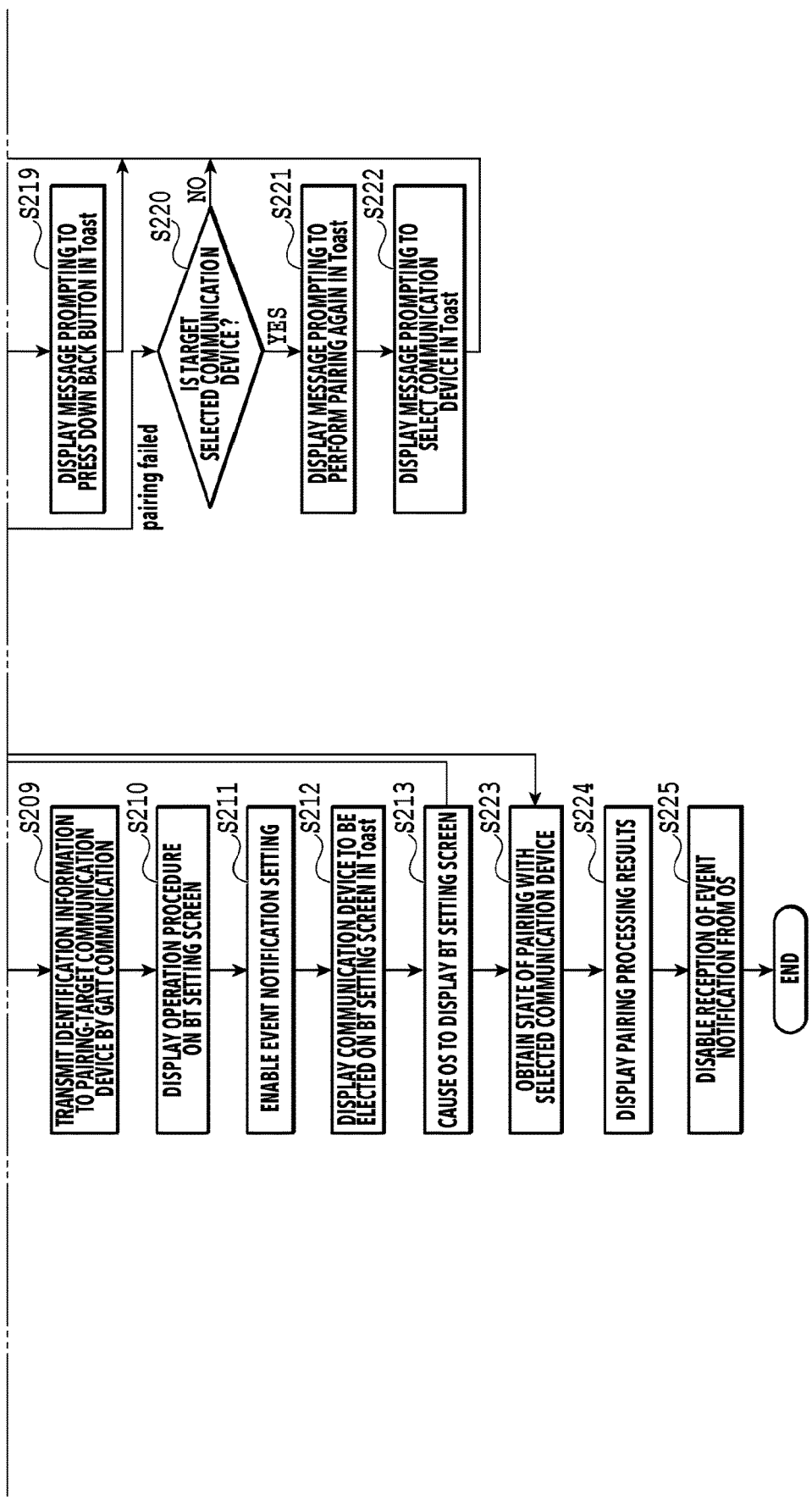

FIG. 2A and FIG. 2B indicates a flowchart showing pairing processing performed by the information processing apparatus 101. The flowchart shown in FIG. 2A and FIG. 2B is implemented by, for example, the CPU 103 reading a program stored in the ROM 104, the external storage device 106 or the like onto the RAM 105 and executing the program. In the present embodiment, it is assumed that the processing shown by the flowchart shown in FIG. 2A and FIG. 2B is performed by the application for printing. Further, in the present embodiment, it is assumed that the application for printing is configured to be capable of receiving a notification indicating that one of various events, such as "during pairing", "pairing completed", and "pairing failed", has occurred via the BT setting screen that is displayed by the application for setting. It is possible to switch between the application for printing actually receiving the notification of the event or not receiving by notification setting, to be described later. Details of the various events will be described later. Further, the processing shown by the flowchart shown in FIG. 2A and FIG. 2B is started in a case where the BLE pairing button 303 is pressed down by a user.

First, at step S201, the CPU 103 determines whether or not the Bluetooth function of the information processing apparatus 101 is valid. The state where the Bluetooth function is valid is a state where it is possible for the information processing apparatus 101 to perform communication by Bluetooth or BLE. Further, as described above, the short-range communication unit 112 operates as a scanner in conformity with the BLE communication standard. Because of this, in the state where it is possible for the information processing apparatus 101 to perform communication by BLE, the CPU 103 causes the short-range communication unit 112 to make a transition into the sate (scanning state) where it is possible to receive advertise information and searches for advertise information. In a case where the CPU 103 determines that the Bluetooth function is valid, the processing advances to step S203 and in a case where the CPU 103 determines that the Bluetooth function is not valid (invalid), the processing advances to step S202. In the following, "step S-" is abbreviated to "S-"

At S202, the CPU 103 enables the disabled Bluetooth function. At this time, it may also be possible for the CPU 103 to display Dialog for causing a user to select whether to enable the Bluetooth function on the display unit 108 and enable the Bluetooth function in a case of receiving instructions from the user via Dialog.

Following the above, at S203, the CPU 103 determines whether or not the short-range communication unit 112 has received advertise information after receiving pressing down of the BLE pairing button 303. In a case where the CPU 103 determines that the advertise information has been received, the processing advances to S204 and in a case where the CPU 103 determines that the advertise information has not been received, the CPU 103 waits for the reception of advertise information by performing the processing at S203 again after waiting for a predetermined time.

Following the above, at S204, the CPU 103 determines whether or not specific identification information is included in the received advertise information. In the present embodiment, it is assumed that in a case of performing pairing processing via the application for printing, the information processing apparatus 101 communicates with a communication device of the model or vendor, which is compatible with the application for printing. Because of this, the specific identification information is identification information indicating that the communication device having transmitted the received advertise information is a communication device of the model compatible with the application for printing or that the communication having transmitted the received advertise information is a communication device provided by a predetermined vendor, which is compatible with the application for printing. More specifically, the specific identification information is information indicating that the communication device having transmitted the received advertise information is capable of providing a printing service (image forming function) or information on the model name, vendor name or the like of the communication device having transmitted the received advertise information. The identification information is only required to be information capable of uniquely specifying the communication device compatible with the application for printing and for example, may be an IP address or MAC address, ID information and the like. In a case where the CPU 103 determines that the specific identification information is included, the processing advances to S205 and in a case of determining that the specific identification information is not included, the CPU 103 waits for the reception of advertise information by performing the processing at S203 again after waiting for a predetermined time. In a case where the short-range communication unit 112 has received a plurality of pieces of advertise information after receiving pressing down of the BLE pairing button 303, the CPU 103 performs the determination at S204 for each piece of advertise information. Then, in a case where the CPU 103 determines that there is at least one piece of advertise information in which the specific identification information is included, the processing advance to S205.

At S205, the CPU 103 displays information relating to the communication device that is the transmission source of the advertise information including the specific identification information on the display unit 108. The information relating to the communication device is included in the advertise information including the specific identification information and is information, for example, such as the name, IP address, or MAC address of the communication device. Further, in a case where a plurality of pieces of advertise information including the specific identification information is received, the CPU 103 displays information relating to the communication device that is the transmission source of each piece of advertise information. Furthermore, the screen on which the information relating to the communication device that is the transmission source of the advertise information including the specific identification information is a screen for causing a user to select the communication device, which is the target of pairing processing. That is, here, by the application for printing, the screen for causing a user to select the communication device, which is the target of pairing processing, is displayed. Further, filtering is performed at S204, and therefore, the information relating to the communication device compatible with the application for printing (capable of executing the various functions by the application for printing) is displayed and the information relating to the communication device not compatible with the application for printing is not displayed.

Following the above, at S206, the CPU 103 determines whether or not the selection of the communication device, which is the target of pairing processing, has been received from a user via the screen displayed at S205. Specifically, the CPU 103 determines whether or not any information of the information relating to the communication device, which is included on the screen displayed at S205, has been selected. In a case where the CPU 103 determines that selection has been received from a user, the processing advances to step S207 and in a case of determining that the selection has not been received from a user, the CPU 103 performs the processing at S203 to S206 again and waits for the selection from a user. In a case of determining that the selection has not been received from a user, it may also be possible for the CPU 103 to perform the processing at S203 and subsequent steps again while keeping the screen for causing a user to select the communication device, which is the target of pairing processing, displayed on the display unit 108. Due to this, it is possible to add the information relating to the transmission source of the advertise information newly received to the screen for causing a user to select the communication device, which is the target of pairing processing. Further, in a case of determining that the selection has been received from a user, the CPU 103 regards instructions to perform pairing processing as having been received from a user and specifies the communication device corresponding to the selected information as the pairing-target communication device. Here, explanation is continued on the assumption that the communication device whose name is "Printer A" is selected by a user.

At S207, the CPU 103 stores the information relating to the pairing-target communication device in a predetermined storage area, such as the external storage device 106 and the ROM 104. The information relating to the pairing-target communication device is, for example, the advertise information transmitted by the pairing-target communication device.

Following the above, at S208, the CPU 103 transmits a request to start GATT communication to the pairing-target communication device based on the information stored at S207. Due to this, the state is brought about where it is possible for the information processing apparatus 101 and the pairing-target communication device to perform the GATT communication of the information that can be communicated without pairing.

Following the above, at S209, the CPU 103 transmits the identification information relating to the information processing apparatus 101 to the pairing-target communication device by the GATT communication. At this time, the CPU 103 transmits the identification information by the GATT communication that is allowed in the state where pairing is not performed. Specifically, the CPU 103 writes the identification information in an area to which writing is possible in the state where pairing is not performed in the GATT profile of the pairing-target communication device. Further, the identification information relating to the information processing apparatus 101 is information, for example, such as the name, IP address, or MAC address of the information processing apparatus 101. In a case of having succeeded in the transmission of the identification information, the CPU 103 terminates the GATT communication and the processing advances to S210. Here, it may also be possible for the CPU 103 to perform the transmission of the identification information until the transmission of the identification information succeeds. Further, it may also be possible to receive interruption of the processing by a user by displaying Dialog and the like on the display unit 108 in the meanwhile or interrupt the processing as a timeout after a predetermined time elapses.

In a case of receiving the identification information transmitted from the information processing apparatus 101 by the GATT communication, the pairing-target communication device stores the received identification information in its own storage area. Then, the pairing-target communication device receives the pairing processing request only while the identification information is stored in the storage area. Further, the pairing-target communication device receives only the pairing processing request from the information processing apparatus corresponding to the identification information stored in the storage area. Due to this, it is possible impose restrictions so that the pairing-target communication device receives the pairing processing request only in a case where the pairing processing is performed via the application for printing. The pairing-target communication device determines whether the pairing processing is completed and whether a predetermined time has elapsed after the identification information is stored, and in a case where either of the determination results is affirmative, deletes the identification information from the storage area.

The processing performed by the pairing-target communication device in a case of receiving the pairing processing request is not limited to the above-described aspect. For example, an aspect may be accepted in which the pairing-target communication device receives the identification information from the information processing apparatus 101 after receiving the pairing processing request from the information processing apparatus 101. In this case, the pairing-target communication device determines whether or not the identification information received from the information processing apparatus 101 after receiving the pairing processing request from the information processing apparatus 101 and the information relating to the information processing apparatus 101, which is included in the pairing processing request, match with each other. Then, in a case where both match with each other, the pairing-target communication device consents to the pairing processing request and starts the pairing processing and in a case where both do not match with each other, the pairing-target communication device does not consent to the pairing processing request and does not start the pairing processing.

Figure 7:
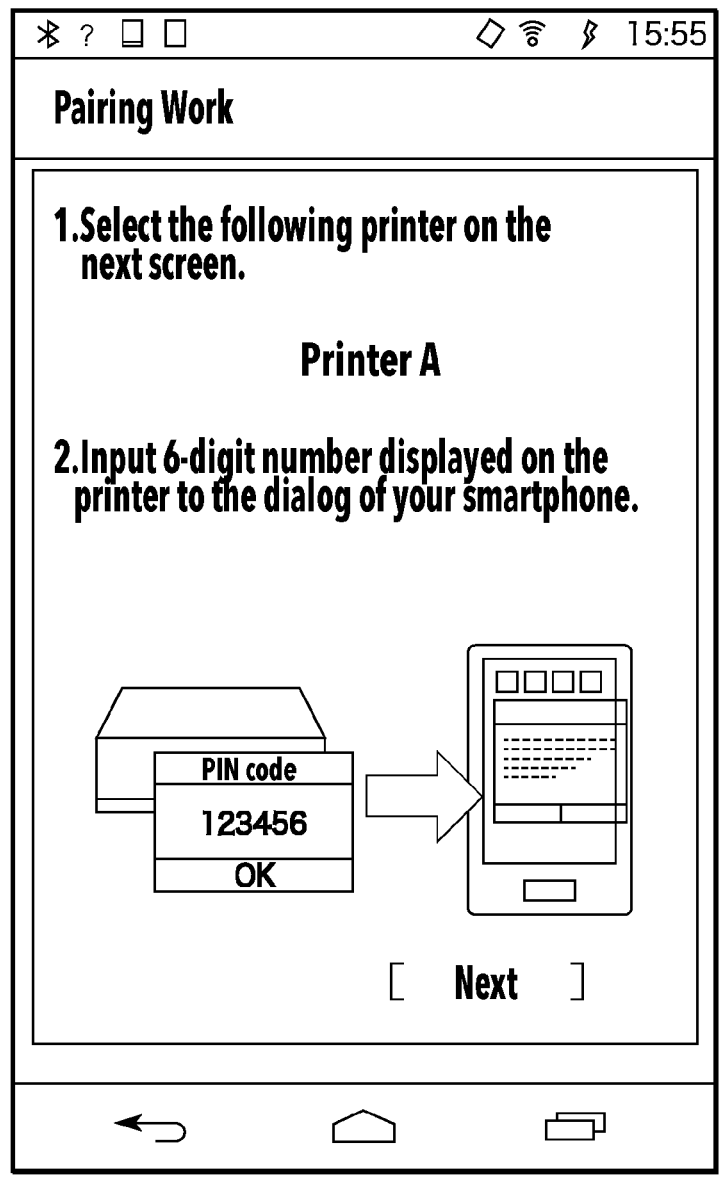
FIG. 7 is a screen that shows an operation procedure that is performed by a user on the BT setting screen and the name of a communication device that should be selected on the BT setting screen.

Following the above, at S210, the CPU 103 displays a screen showing the procedure of the operation performed by a user in the pairing processing on the display unit 108. As described above, in the present embodiment, the operation, such as the input of information necessary for pairing, necessary for the pairing processing is performed on the BT setting screen of the application for setting running on the information processing apparatus 101. Because of this, at S208, the CPU 103 displays the operation procedure that is performed by a user on the BT setting screen, the name of the communication device, which should be selected on the BT setting screen, and the like on the display unit 108 in Dialog or the like. Further, the CPU 103 displays an element (for example, button) for receiving instructions to advance to the next step from a user. Specifically, for example, at S210, the CPU 103 displays a screen as shown in FIG. 7. At S210, in a case of detecting that instructions to advance to the next step are received from a user, the CPU 103 closes Dialog displayed on the display unit 108 and the processing advances to S211.

Following the above, at S211, the CPU 103 enables the event notification setting for the application for printing. Specifically, the CPU 103 performs the setting so that it is possible for the application for printing to receive the notification of an event that occurs in accordance with the operation for the BT setting screen that is displayed by the application for setting. Due to this, it is possible for the application for printing to recognize that the event, such as "during pairing", "pairing completed, and "pairing failed", has occurred in accordance with the operation for the BT setting screen and perform the processing defined in advance in accordance with the occurrence of the event.

Following the above, at S212, the CPU 103 displays a message in Toast that prompts a user to select the communication device selected by the user via the screen displayed at S205 on the BT setting screen that is displayed on the display unit 108 at S211. That is, here, the CPU 103 displays a message in Toast that prompts a user to select the communication device whose name is "Printer A" on the BT setting screen. Although described later, Toast that is displayed at this time continues to be displayed on the front surface of the BT setting screen even in a case where the BT setting screen is displayed. That is, it is possible for a user to select the communication device on the BT setting screen while checking the message displayed in Toast, and therefore, it is possible for the user to grasp which communication device should be selected on the BT setting screen both quickly and correctly.

As described above, the Toast function is the function in possession of the OS, and therefore, in a case of causing Toast to be displayed by using the application for printing, the CPU 103 transmits the request for causing Toast to be displayed to the OS along with the contents of the message that is contained in Toast. Due to this, it is possible for the CPU 103 to cause Toast to be displayed by using the application for printing. As described above, it is possible for the CPU 103 to display Toast even in a case where the program requesting Toast to be displayed has made a transition into the background. The state where a certain program has made a transition into the background refers to the state where a screen that is displayed by a program other than the certain program is displayed on the display unit 108 while the certain program continues its operation. On the other hand, the state where a certain program has made a transition into the foreground refers to the state where a screen that is displayed by the certain program is displayed on the display unit 108 while the certain program continues its operation.

Following the above, at S213, the CPU 103 switches the screen that is being displayed on the display unit 108 from the screen that is displayed by the application for printing to the BT setting screen that is displayed by the application for setting. Then, the CPU 103 causes the application for printing to make a transition into the background. Specifically, by the instructions by the application for printing, the CPU 103 causes the display unit 108 to display the screen that is displayed by the application for setting while keeping the application for printing in operation. Here, the aspect is explained in which the screen that is being displayed on the display unit 108 is switched from the screen as shown in FIG. 7 to the BT setting screen. However, the aspect is not limited to this and an aspect may be accepted in which, for example, after the instructions to perform pairing processing are received on the screen as shown in FIG. 3, the screen as shown in FIG. 3 is switched directly to the BT setting screen.

Figures 4A, 4B, 4C:
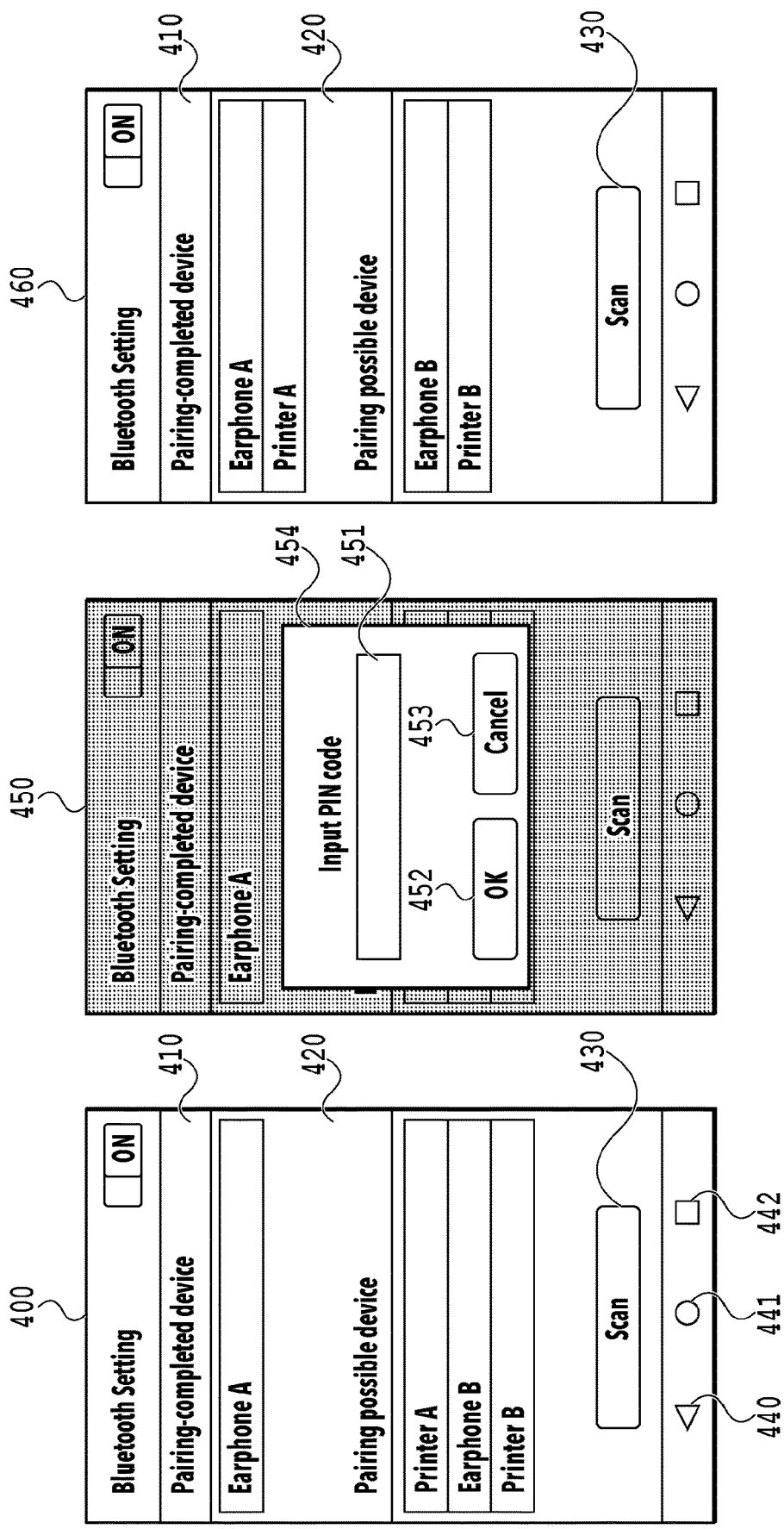
FIG. 4A to FIG. 4C are each an example of a BT setting screen that is displayed by an application for setting.

FIG. 4A to FIG. 4C each show an example of the BT setting screen that is displayed by the application for setting. The BT setting screen is a screen for performing setting relating to the Bluetooth function of the information processing apparatus 101. Specifically, the BT setting screen is, for example, a screen for receiving selection of a communication device from a user, for which pairing processing with the information processing apparatus 101 is performed.

First, the CPU 103 displays a BT setting screen 400 shown in FIG. 4A on the display unit 108. The BT setting screen 400 has a Pairing-completed device list 410, a Pairing possible device list 420, and a Scan button 430.

The Pairing-completed device list 410 is an area in which information relating to the communication device for which the pairing processing with the information processing apparatus 101 has already been performed (pairing with the information processing apparatus 101 has already been completed) is displayed in a list.

The Pairing possible device list 420 is an area in which information relating the communication device with which the information processing apparatus 101 can perform pairing processing. The communication device with which the information processing apparatus 101 can perform pairing processing is the communication device that is the transmission source of the advertise information received by the information processing apparatus 101. For the communication device that is displayed in the Pairing possible device list 420, filtering is not performed in particular. Because of this, in the Pairing possible device list 420, the communication device not compatible with the application for printing (for example, device other than printer, printer not compatible with the application for printing giving instructions to perform pairing processing) is also displayed. Then, by one of the communication devices displayed in the Pairing possible device list 420 being selected by a user, the pairing processing with the selected communication device is started.

The Scan button 430 is a button for the information processing apparatus 101 to start search (scan) of advertise information transmitted from the BLE-compatible communication device around the information processing apparatus 101 in order to update the contents of the Pairing possible device list 420.

A back button 440 is a button for displaying the screen again, which was being displayed on the display unit 108 immediately before the screen currently being displayed. As described above, the BT setting screen 400 on which the back button 440 is included is the screen that is displayed by the application for setting. In a case where the screen that was being displayed immediately before the BT setting screen 400 is a screen by a program other than the application for setting, on a condition that the back button 440 is pressed down, the screen that is displayed by the program other than the application for setting is displayed again. In the present embodiment, the screen that was being displayed immediately before the BT setting screen 400 is the screen that is displayed by the application for printing, and therefore, in a case where the back button 440 is pressed down, the screen that is displayed by the application for printing is displayed again.

A home button 441 is a button for displaying a home screen that is displayed by the OS. The home screen is, for example, a screen on which icons for activating application programs (application for printing and the like) of the information processing apparatus 101 are arranged.

A task list button 442 is a button for displaying a screen for selecting a program that is run in the foreground. Because of this, also by the application for printing being selected on the screen that is displayed in a case where the task list button 442 is pressed down, the screen that is displayed by the application for printing is displayed again.

In a case where the Scan button 430 is pressed down, the CPU 103 causes the information processing apparatus 101 to make a transition into a scanning state, which is a state of capable of receiving advertise information that is transmitted from the communication device around the information processing apparatus 101. Next, in a case of receiving advertise information, the CPU 103 specifies the name (Complete Local Name) of the communication device that is the transmission source of the advertise information, which is included in the received advertise information. Then, the CPU 103 updates the display contents of the Pairing possible device list 420 by adding and displaying the specified name to and in the Pairing possible device list 420.

It is assumed that the name of the communication device, which is displayed in the Pairing-completed device list 410 and the Pairing possible device list 420, is information included in the received advertise information. In the advertise information, in addition to the name of the communication device, identification information (Bluetooth device address: BD_ADDR) for individual recognition of the short-range communication unit of the communication device that is the transmission source of the advertise information, and the like are included. Because of this, it may also be possible to display the identification information in the Pairing-completed device list 410 and the Pairing possible device list 420. The CPU 103 appropriately stores the advertise information received from the communication device that is displayed in the Pairing-completed device list 410 or the Pairing possible device list 420 in the storage area (RAM 105, external storage device 106 and the like) of the information processing apparatus 101.

As described above, by one of the communication devices that are displayed in the Pairing possible device list 420 being selected by a user, the pairing processing with the selected communication device is started. However, as described above, the BT setting screen is the screen that is displayed by the application for setting and in the display of the candidates of the pairing-target communication device, filtering for displaying the communication device appropriate for the application for printing is not performed. Consequently, in the Pairing possible device list 420, for example, information on the communication device other than the communication device selected by a user via the screen displayed at S205 and the communication device not compatible with the application for printing because of not having the print function is also displayed. Consequently, in this case, there is such a problem that it is difficult for a user to see which communication device should be selected as the communication device, which is the target of the pairing processing via the application for printing.

Consequently, in the present embodiment, in a case where the BT setting screen is displayed on the display unit 108, the CPU 103 displays Toast showing the procedure of the user operation on the front surface on the BT setting screen by the application for printing. Specifically, for example, the CPU 103 displays a BT setting screen 600 shown in FIG. 6A, which is the BT setting screen 400 shown in FIG. 4A on the front surface on which Toast 601 is displayed. In Toast 601, a message is displayed, which prompts a user to select "Printer A", the communication device selected by the user on the screen that is displayed by the application for printing at S205. By designing the aspect such as this, it is possible to improve convenience of a user by suppressing the occurrence of an erroneous operation. The aspect may be one in which Toast that is displayed at this time includes information (name) on the communication device compatible with the application for printing in place of the communication device selected by a user on the screen that is displayed by the application for printing at S205.

In the present embodiment, first, Toast is displayed at S212, and then the BT setting screen is displayed at S213, but the display order is not limited to this aspect. That is, it may also be possible to display Toast after displaying the BT setting screen.

Following the above, at S214, the CPU 103 determines whether or not the application for printing in the background has made a transition into the foreground. Specifically, the CPU 103 determines whether or not the screen that is being displayed on the display unit 108 has switched from the BT setting screen to the screen that is displayed by the application for printing. For example, in a case where the screen that is displayed by the application for printing is selected on the selection screen that is displayed by the back button 440 being pressed down, or the task list button 442 being pressed down, the application for printing makes a transition into the foreground. In a case where the CPU 103 determines that the application for printing has made a transition into the foreground, the processing advances to S223 and in a case where the CPU 103 determines that the application for printing has not made a transition into the foreground, the processing advances to S215.

Following the above, at S215, the CPU 103 determines whether or not the application for printing has been notified of an even via the BT setting screen that is displayed by the application for setting. In a case of determining that the application for printing has been notified of an event, the CPU 103 performs the following processing in accordance with the contents of the notified event. Specifically, in a case where the CPU 103 determines that the contents of the notified event indicate "during pairing", the processing advances to S216. Further, in a case where the CPU 103 determines that the contents of the notified event indicate "pairing completed", the processing advances to S218. Furthermore, in a case where the CPU 103 determines that the contents of the notified event indicate "pairing failed", the processing advances to S220. On the other hand, in a case of determining that the application for printing has been notified of no event, the CPU 103 performs again the processing at S214.

Figure 5:
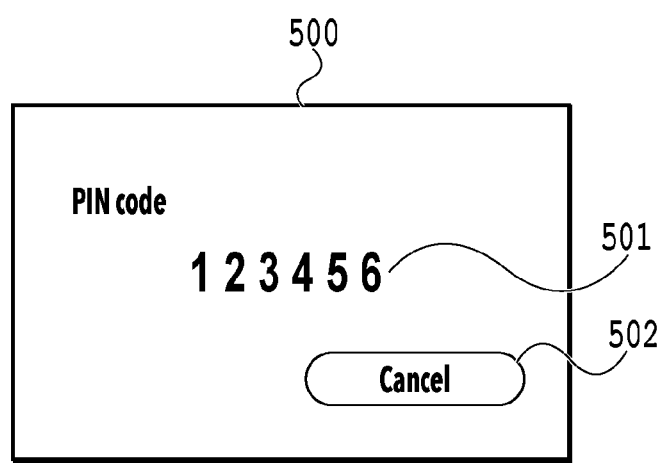
FIG. 5 is a PIN code display screen that is displayed on a display unit of a communication device.

Here, details of the various events are explained. The event indicating "during pairing" is an event that occurs in a case where instructions to perform pairing processing are given via the BT setting screen 600. Specifically, the event indicating "during pairing" occurs by one of the communication devices displayed in the Pairing possible device list 420 being selected by a user. In a case where instructions to perform pairing processing are given, the application for setting reads the advertise information received from the communication device selected by a user (in the following, described as "user-selected communication device) from the storage area and specifies information necessary for the pairing processing, such as identification information, by using the read advertise information. Then, the application for setting transmits the specified information and a pairing request based on the BLE communication standard to the user-selected communication device. The communication device having received the pairing request displays a PIN code display screen 500 as shown in FIG. 5 on a display unit (not shown schematically) of the communication device. On the PIN code display screen 500, a PIN code 501, which is authentication information used for pairing processing, and a Cancel button 502 for cancelling pairing processing are displayed.

Then, in a case of transmitting a pairing request because the event indicating "during pairing" has occurred, the application for setting displays a PIN code input screen 450 shown in FIG. 4B on the display unit 108. The PIN code input screen 450 is the BT setting screen 400 shown in FIG. 4A on the front surface on which PIN code input Dialog 454 is displayed. Further, in the PIN code input Dialog 454, a PIN code input area 451, an OK button 452, and a Cancel button 453 are displayed. The PIN code input area 451 is an area for receiving a PIN code input by a user. The OK button 452 is a button for transmitting the input PIN code to the user-selected communication device. The Cancel button 453 is a button for cancelling pairing processing.

There is an aspect in which, for example, a period of time during which it is possible to input the PIN code 501 to the PIN code input area 451 (period of time during which input will succeed) is determined depending on the specifications of the OS. The period of time during which it is possible to input the PIN code 501 to the PIN code input area 451 is, for example, 30 seconds. In that case, unless the PIN code 501 is input and the OK button 452 is pressed down within 30 seconds after the PIN code input screen 450 is displayed, the PIN code 501 is not transmitted to the user-selected communication device. That is, pairing processing will fail.

In a case where the OK button 452 is pressed down during the above-described period of time in the state where the PIN code 501 is input to the PIN code input area 451, the application for setting transmits information including the input PIN code 501 to the user-selected communication device. The user-selected communication device determines whether or not the PIN code 501 included in the received information matches with the PIN code 501 displayed on the PIN code display screen 500 (PIN code corresponding to the communication device). Then, in a case of determining the both match with each other, the user-selected communication device allows the information processing apparatus 101 to perform pairing. Specifically, the user-selected communication device transmits a link key created by a predetermined method based on the PIN code 501 to the information processing apparatus 101 by utilizing SMP (Security Manager Protocol) in conformity with the BLE standard. In this manner, the link key is stored in the storage area (ROM 104 and the like) of the information processing apparatus 101 and the storage area (ROM 152 and the like) of the user-selected communication device, respectively. Due to this, pairing is completed and the BLE communication is allowed to be performed between the devices. Then, in a case where the pairing processing is completed (succeeds) in this manner, the event indicating "pairing completed" occurs.

In a case where the pairing processing is completed, the application for setting displays a BT setting screen 460 shown in FIG. 4C, on which the PIN code input Dialog 454 is not displayed. By the occurrence of the event indicating "pairing completed", the communication device indicated by "Printer A" and the information processing apparatus 101 enter the pairing-completed state. Because of this, the application for setting adds "Printer A" to the Pairing-completed device list 410 and deletes "Printer A" from the Pairing possible device list 420.

On the other hand, in a case where it is determined that the PIN code 501 included in the received information does not match with the PIN code 501 displayed on the PIN code display screen 500, pairing fails. Because of this, the user-selected communication device does not transmit the link key described previously to the information processing apparatus 101. Further, in that case, the user-selected communication device transmits information indicating that pairing has failed to the information processing apparatus 101. In a case where the pairing processing has failed, it is preferable for the pairing processing to be performed again, and therefore, the application for setting displays the BT setting screen 400 shown in FIG. 4A again on the display unit 108. The case where pairing fails is not necessarily limited to the case where the PIN codes do not match with each other. For example, in a case where the Cancel button 453 is pressed down on the PIN code input screen 450 in FIG. 4B and in a case where the Cancel button 502 is pressed down on the PIN code display screen 500 in FIG. 5, pairing will fail as well. Further, for example, in a case where nothing is input to the PIN code input area 451 for a long time, pairing will fail as well. In a case where pairing processing fails as described above, the event indicating "pairing failed" occurs.

With the above in mind, explanation is returned to the processing in FIG. 2A and FIG. 2B.

At S216, the CPU 103 determines whether or not the communication device selected on the BT setting screen 600 that is displayed by the application for setting matches with the communication device selected on the screen that is displayed by the application for printing at S205. In the notification of the event indicating "during pairing", the identification information on the communication device selected on the BT setting screen 600 that is displayed by the application for setting is included. Because of this, specifically, the CPU 103 performs the determination processing at this step by comparing the identification information included in the notification of the event indicating "during pairing" and the information stored at S207. In a case where the CPU 103 determines that both match with each other, the processing advances to S217 and in a case where the CPU 103 determines that both do not match with each other, the processing returns to S214. In a case of determining that both do not match with each other, it may also be possible for the CPU 103 to display Toast indicating that the communication device selected on the BT setting screen 600 does not match with the communication device selected on the screen that is displayed at S205. Further, for example, it may also be possible for the CPU 103 to display Toast for prompting a user to abort the pairing processing with the communication device selected on the BT setting screen 600. Furthermore, for example, it may also be possible for the CPU 103 to display again Toast indicating the communication device selected on the screen that is displayed at S205.

Figures 6A, 6B:
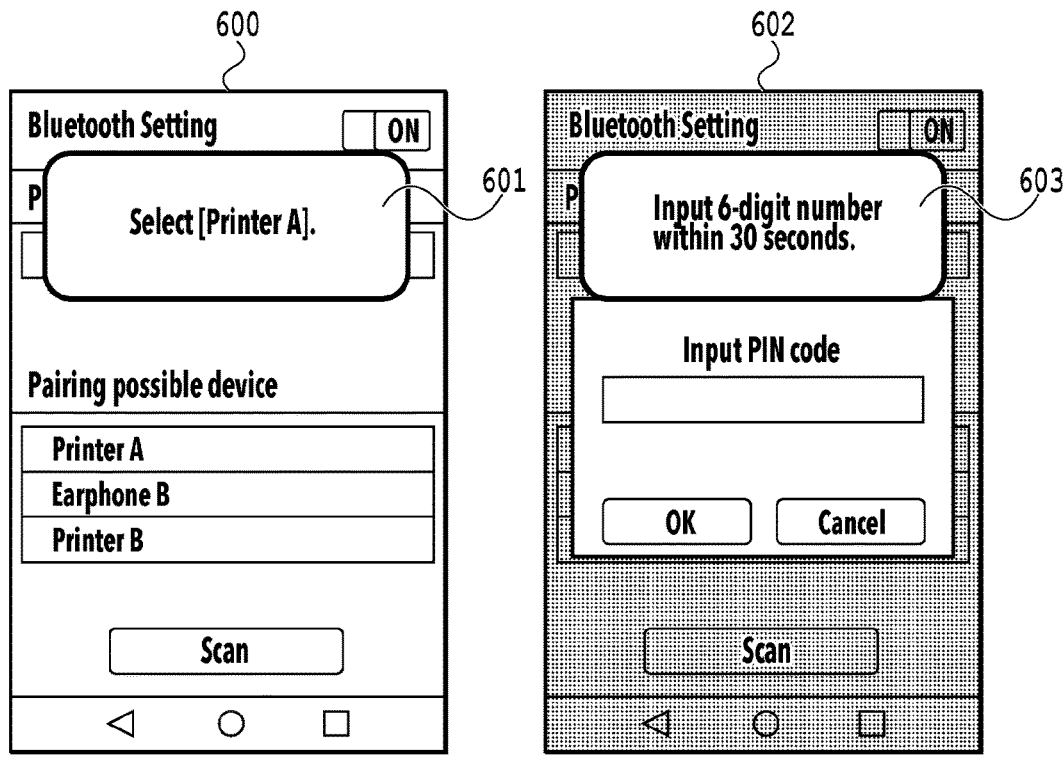
FIG. 6A to FIG. 6D are each the BT setting screen that is displayed by the application for setting and Toast that is displayed by the application for printing.

As described above, in a case where the event indicating "during pairing" occurs, by the application for setting, the PIN code input screen 450 shown in FIG. 4B is displayed on the display unit 108. Further, as described above, there is an aspect in which, for example, a period of time during which it is possible to input the PIN code 501 to the PIN code input area 451 (period of time during which input will succeed) is determined depending on the specifications of the OS. Consequently, at S217, the CPU 103 performs display control to display Toast 603 including information relating to the period of time during which input of the PIN code 501 will succeed on the front surface on the PIN code input screen 450. As a result, on the display unit 108, a BT setting screen 602 shown in FIG. 6B is displayed. Specifically, Toast 603 displays a message for prompting a user to input the PIN code 501 within 30 seconds after the PIN code input screen 450 is displayed and the number of digits of the PIN code 501 that is input. Due to this, it is possible for a user to perform the operation with cautions in inputting the PIN code 501 in mind, and therefore, usability in inputting the PIN code 501 improves. After S217, the CPU 103 performs the processing at S214 again.

At S218, the CPU 103 determines whether or not the communication device having completed the pairing processing with the information processing apparatus 101 matches with the communication device selected on the screen that is displayed by the application for printing at S205. In the notification of the event indicating "pairing completed", the identification information on the communication device having completed the pairing processing with the information processing apparatus 101 is included. Because of this, specifically, the CPU 103 performs the determination processing at this step by comparing the identification information included in the notification of the event indicating "during pairing" and the information stored at S207. In a case where the CPU 103 determines that both match with each other, the processing advances to S219 and in a case where the CPU 103 determines that both do not match with each other, the processing returns to S214. In a case of determining that both do not match with each other, it may also be possible for the CPU 103 to display Toast indicating that the communication device having completed the pairing processing with the information processing apparatus 101 does not match with the communication device selected on the screen that is displayed at S205.

Figures 6C, 6D:
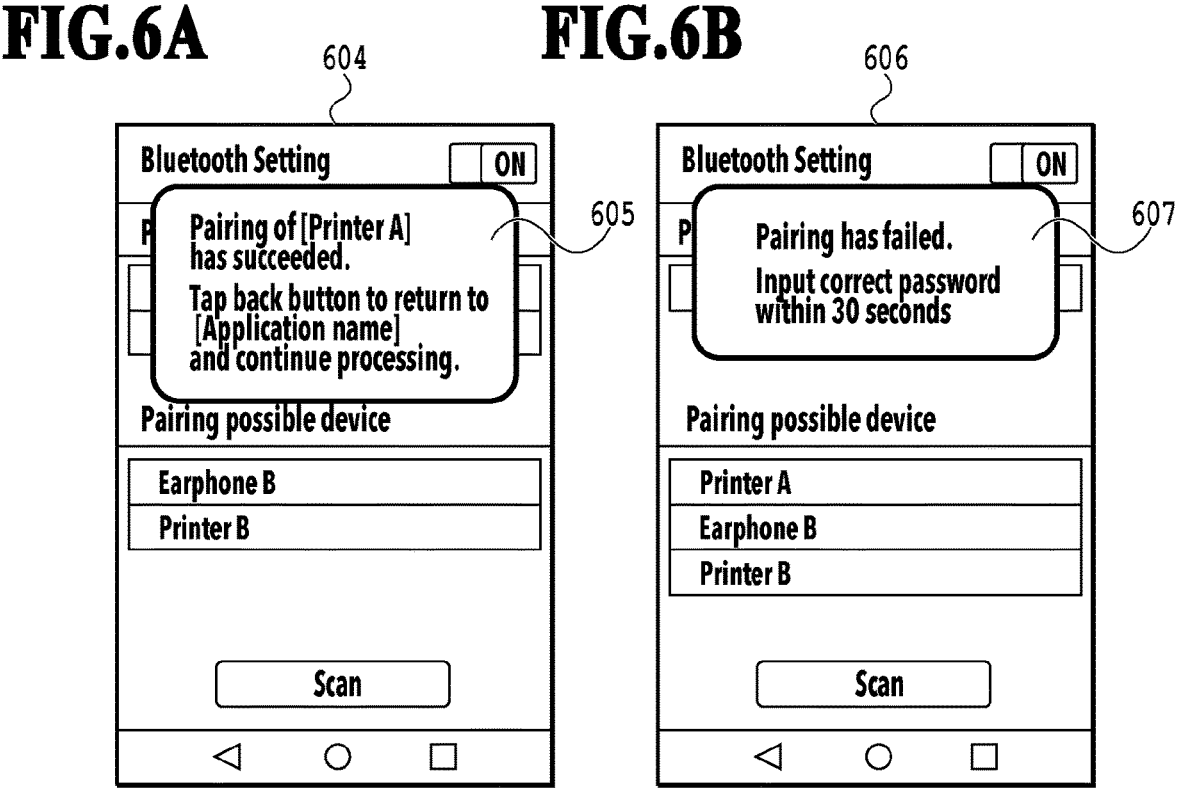

As described above, in a case where the event indicating "pairing completed" occurs, by the application for setting, on the display unit 108, the BT setting screen 460 shown in FIG. 4C is displayed. In a case where the pairing processing is completed (succeeds) normally (the communication device having completed the pairing processing with the information processing apparatus 101 matches with the communication device selected on the screen that is displayed at S205), it is preferable for the screen that is displayed by the application for printing to be displayed again. That is, it is preferable that the back button 440 be pressed down and the application for printing make a transition into the foreground. Consequently, at S219, the CPU 103 displays Toast 605 including a notification for causing the application for printing to make a transition into the foreground is displayed on the front surface on the BT setting screen 460. As a result, on the display unit 108, a BT setting screen 604 shown in FIG. 6C is displayed. Specifically, in Toast 605, wording reporting that pairing with the selected communication device has succeeded and the operation method (instructions to press down the back button 440) for causing the application for printing to make a transition into the foreground are displayed. Due to this, it is possible for a user to smoothly perform the operation for causing the application for printing to make a transition into the foreground. After S219, the CPU 103 performs the processing at S214 again.

At S220, the CPU 103 determines whether or not the communication device having failed the pairing processing with the information processing apparatus 101 matches with the communication device selected on the screen that is displayed by the application for printing at S205. In the notification of the event indicating "pairing failed", the identification information on the communication device having failed the pairing processing with the information processing apparatus 101 is included. Because of this, specifically, the CPU 103 performs the determination processing at this step by comparing the identification information included in the notification of the event indicating "pairing failed" and the information stored at S207. In a case where the CPU 103 determines that both match with each other, the processing advances to S221 and in a case where the CPU 103 determines that both do not match with each other, the processing returns to S214. In a case of determining that both do not match with each other, it may also be possible for the CPU 103 to display Toast indicating that the communication device having failed the pairing processing with the information processing apparatus 101 does not match with the communication device selected on the screen that is displayed at S205.

As described above, in a case where the event indicating "pairing failed" occurs, in order to cause the pairing processing to be performed again, by the application for printing, on the display unit 108, the BT setting screen 400 shown in FIG. 4A is displayed again. That is, the BT setting screen in the state where the pairing processing with the communication device indicated by "Printer A" is not completed is displayed. Consequently, at S221, the CPU 103 displays Toast 607 including a notification for prompting a user to perform the pairing processing again on the front surface on the BT setting screen 400. As a result, on the display unit 108, a BT setting screen 606 shown in FIG. 6D is displayed. Specifically, in Toast 607, a notification indicating that the pairing has failed and the operation method (notification to give instructions to input a correct password within 30 seconds) for performing the pairing processing normally are displayed. Due to this, it is possible for a user to smoothly perform the pairing processing again even in a case where the pairing processing fails. It may also be possible for the CPU 103 to include a notification indicating the cause of the failure of the pairing processing in Toast 607.

Following the above, at S222, the CPU 103 displays Toast 601 including a message prompting a user to select the communication device selected by the user via the screen that is displayed at S205 on the BT setting screen. As a result, on the display unit 108, the BT setting screen 600 shown in FIG. 6A is displayed again. Due to this, it is possible to notify a user again which communication device to select. After S222, the CPU 103 performs the processing at S214 again.

At S223, the CPU 103 obtains information relating to the pairing state between the communication device selected on the screen that is displayed by the application for printing at S205 and the information processing apparatus 101 from the OS. Due to this, it is possible for the CPU 103 to specify whether or not the pairing between the communication device selected on the screen that is displayed by the application for printing at S205 and the information processing apparatus 101 is completed. The specification method is not limited to this method. For example, it may also be possible for the CPU 103 to store the event indicating "pairing completed" and the event indicating "pairing failed" in advance, both received via the application for setting, and then specify whether or not the pairing between the communication device and the information processing apparatus 101 is completed in accordance with the stored event.

Following the above, at S224, the CPU 103 displays a notification area on the display unit 108 by one of the notification functions based on the specification results at S223. At this time, on the display unit 108, the screen that is displayed by the application for printing is displayed, and therefore, it is possible for the CPU 103 to display any notification area on the front surface on the screen. In a case of specifying that the pairing between the communication device selected on the screen that is displayed by the application for printing at S205 and the information processing apparatus 101 is completed, the CPU 103 displays a notification area including a message indicating that the pairing processing is completed. In a case of specifying that the pairing between the communication device selected on the screen that is displayed by the application for printing at S205 and the information processing apparatus 101 is not completed, the CPU 103 displays a notification area including a message indicating that the pairing processing has failed. In a case where the pairing processing has failed, for example, it may also be possible to perform the processing from S204 or the like again and perform the pairing processing again.

Following the above, at S225, the CPU 103 performs setting so that the application for printing does not receive the notification of the event that occurs in response to the operation for the BT setting screen that is displayed by the application for setting (reception of invent notification is disabled). Due to this, the application for printing receives the notification of the event only at the time of pairing processing via the BT setting screen that is displayed by the application for setting and displays Toast in accordance with the even that occurs, and therefore, it is possible to perform notification by Toast at appropriate timing.

After that, the CPU 103 terminates the processing. At this time, on the display unit 108, the screen that is displayed by the application for printing is displayed, and therefore, it may also be possible for the CPU 103 to perform the function of the application for printing continuously in accordance with user instructions. For example, it may also be possible to perform the setting processing relating to the connection between the communication device having completed pairing and the information processing apparatus 101 via BLE, transmit a print job to the communication device having completed pairing, and so on. By designing the aspect such as this, it is possible for a user to use the application for printing continuously as well after the pairing processing is completed.

Figure 11:
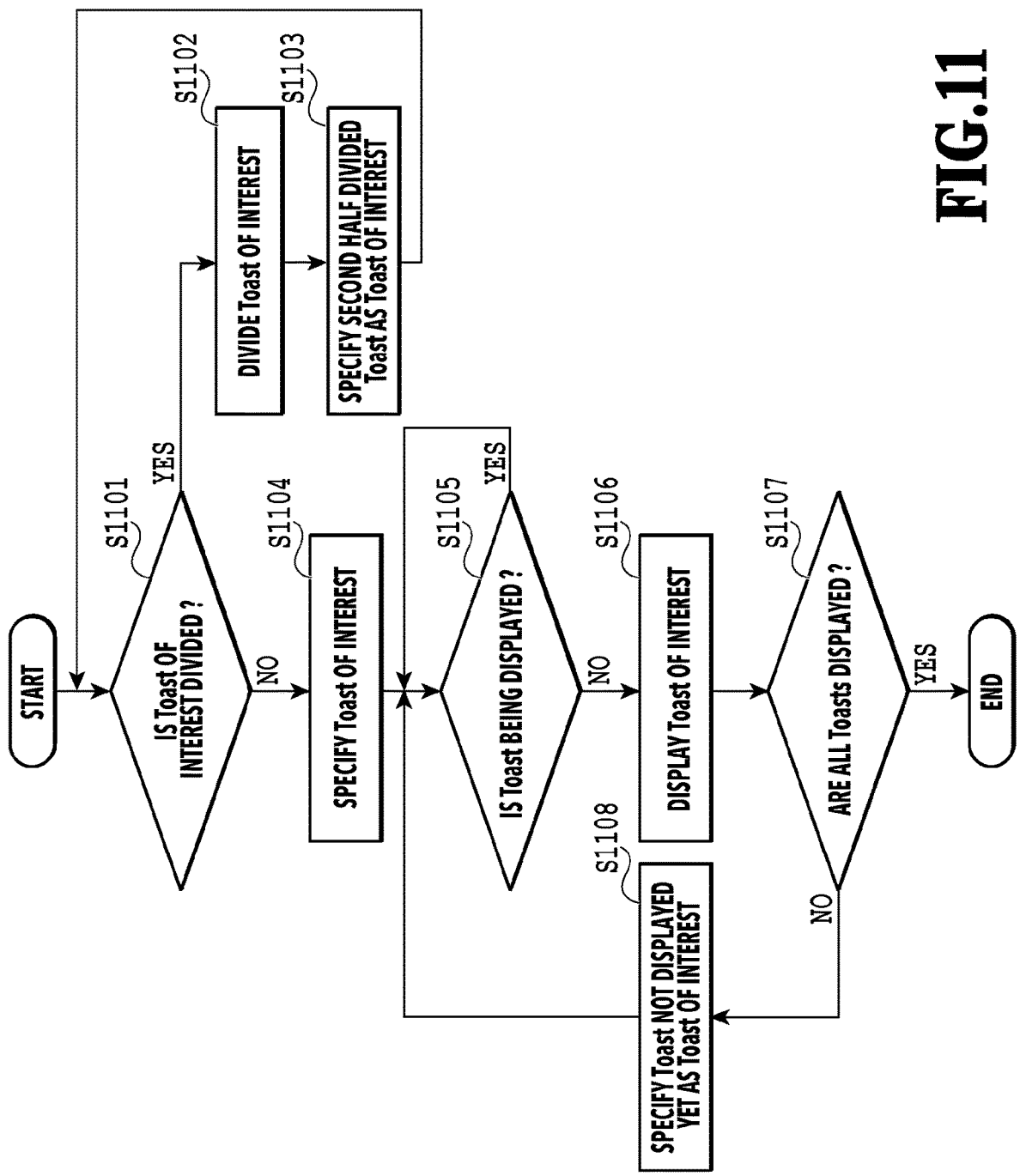
FIG. 11 is a flowchart of UI display processing in a first embodiment.

As explained above, in the present embodiment, the user operation is prompted by Toast 601, Toast 603, Toast 605, and Toast 607. As shown in FIG. 6A to FIG. 6D, the number of characters in Toast 605 is large compared to that in Toast 601 or Toast 603, and therefore, there is a possibility that visual recognizability will deteriorate because of the characteristic that the Toast display disappears automatically in a case where a predetermined time elapses. Further, depending on the kind or version of OS, there is a case where the number of characters that can be displayed in Toast at a time is limited and on a condition that the number of characters of a message is large, such a problem happens sometimes that part of the contents is not displayed in Toast. Consequently, in the present embodiment, in a case where a message whose number of characters exceeds a specific number of characters is displayed by the Toast function, the application for printing is caused to determine whether or not to produce divided display automatically by performing the series of processing shown by the flowchart in FIG. 11. The flowchart in FIG. 11 is performed by the application for printing in a case where notification is performed by the Toast function and Toast to be displayed by the Toast notification is specified by the application for printing. In the following processing, processing is performed for Toast specified as Toast of interest and at the time of the start of this flowchart, Toast specified here is taken as Toast of interest.

At S1101, the CPU 103 determines whether or not to divide Toast of interest. Specifically, the CPU 103 determines whether or not the number of line feed codes in the character string included in Toast of interest is larger than or equal to a predetermined threshold value. In a case where the number of line feed codes in the character string included in Toast of interest is less than the predetermined threshold value, the CPU 103 determines not to divide Toast of interest and the processing advances to S1104. On the other hand, in a case where the number of line feed codes in the character string included in Toast of interest is larger than or equal to the predetermined threshold value, the CPU 103 determines to divide Toast of interest and the processing advances to S1102. Here, as an example, the number of line feed codes, which is one, is used as the predetermined threshold value that is used at this step, but it may also be possible to use an arbitrary value (integer) larger than or equal to two as the threshold value such as this. Further, the present determination is performed based on the number of line feed codes, but the aspect is not limited to this. For example, it may also be possible to determine whether or not the number of characters included in the character string included in Toast of interest is larger than or equal to a predetermined threshold value and determine to divide Toast of interest in a case where the number of characters is larger than or equal to the predetermined threshold value. Further, for example, it may also be possible to employ, as a value inherent in a character string, a value that is calculated based on the number of characters and the number of line feed codes included in the character string, determine whether or not the value inherent in the character string is larger than or equal to a predetermined threshold value, and determine to divide Toast of interest in a case where the value inherent in the character string is larger than or equal to the predetermined threshold value.

At S1102, the CPU 103 divides Toast of interest. Specifically, the CPU 103 performs processing to divide the character string included in Toast of interest at the position where the line feed code is included. Due to this, divided Toast including the first half of the divided character strings and divided Toast including the second half of the divided character strings are generated.

At S1103, the CPU 103 specifies divided Toast including the second half of the character string of divided Toasts generated at S1102 as Toast of interest. After that, the processing advances to S1101 and the CPU 103 performs processing for divided Toast including the second half of the character string.

At S1104, the CPU 103 specifies Toast of interest. Specifically, in a case where Toast of interest specified first is divided, the CPU 103 specifies divided Toast including the first character string of the divided character strings as Toast of interest. In a case where Toast of interest specified first is not divided, Toast of interest specified first is specified as Toast of interest as it is.

At S1105, the CPU 103 determines whether or not Toast other than Toast of interest is already displayed on the screen. In a case where the CPU 103 determines that another Toast is not displayed, the processing advances to S1106. On the other hand, in a case where the CPU 103 determines that another Toast is displayed, the CPU 103 stands by until Toast being displayed disappears by repeating this determination. The determination processing at this step is processing necessary for performing control so that Toast does not overlap another Toast in a case where a plurality of Toasts is displayed continuously.

At S1106, the CPU 103 requests/instructs the OS to display Toast of interest by the Toast function.

At S1107, the CPU 103 determines whether or not all Toasts corresponding to Toast of interest specified first are displayed. All Toasts corresponding to Toast of interest specified first are all divided Toasts generated by Toast of interest specified first being divided. In a case where Toast of interest specified first is not divided, all Toasts corresponding to Toast of interest specified first are Toast of interest itself specified first. In a case of determining that all Toasts corresponding to Toast of interest specified first are displayed, the CPU 103 terminates the processing of this flowchart. On the other hand, in a case where the CPU 103 determines that all Toasts corresponding to Toast of interest specified first are not displayed, the processing advances to S1108. Then, at S1108, the CPU 103 specifies divided Toast that is not displayed yet and which includes the first character string among all Toasts corresponding to Toast of interest specified first as Toast of interest. After this, the processing returns to S1105.

Figure 12:
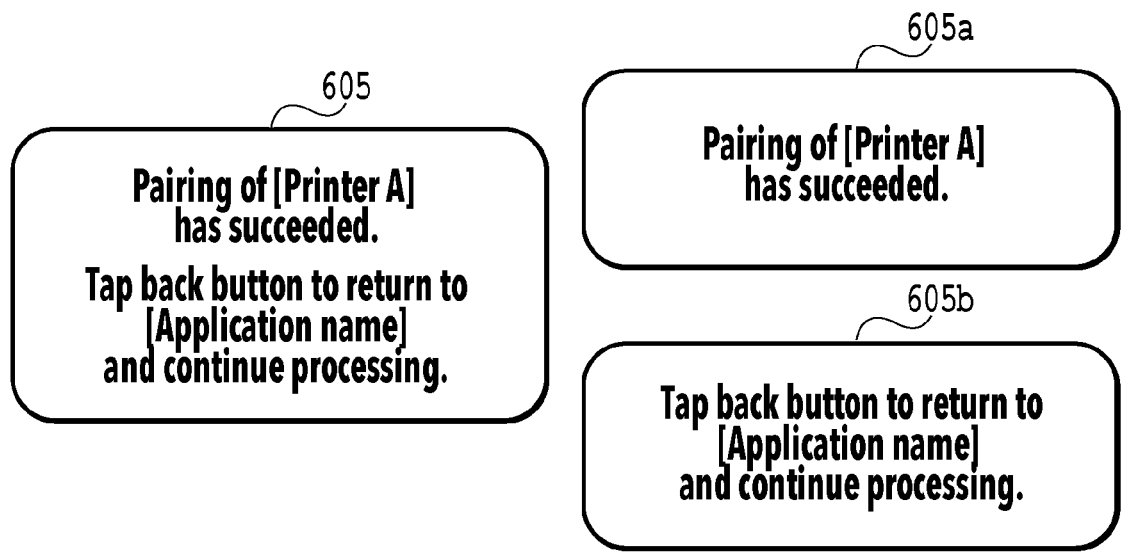
FIG. 12 is UI display of Toast as results of the first embodiment.

By the above series of processing, for example, Toast 605a is displayed in place of Toast 605 shown in FIG. 12 and after Toast 605a disappears, Toast 605b is displayed. In this manner, a pop-up that is generated by the display-target character string being divided is displayed sequentially. Consequently, it is possible to improve the visual recognizability of a user more than a case where Toast 605 is displayed as it is.

As described above, in the present embodiment, in order to perform BLE communication by the application for printing, the pairing processing is performed by utilizing the BT setting screen that is displayed by the application for setting. In this case, in the present embodiment, at the time of displaying various kinds of information in Toast on the BT setting screen by the application for printing, the application for printing is caused to automatically determine whether it is possible to display the information as it is or to divide and display the information for each Toast display. Consequently, according to the present embodiment, it is possible to improve the visual recognizability of a user, and therefore, it is possible to improve convenience by suppressing an erroneous operation of a user.

In the above, the aspect is explained in which Toast is displayed on the BT setting screen, but the aspect is not limited to this. The timing at which Toast is displayed and the contents of a message that is notified by Toast may be determined arbitrarily by the application program that causes Toast to be displayed. For example, an aspect may be accepted in which in order to perform Wi-Fi communication by the application for printing, on the Wi-Fi setting screen that is displayed by the application for setting, Toast including a message indicating the operation that should be performed on the setting screen is displayed. Further, for example, an aspect may be accepted in which in a case where a printing setting operation relating to a print job that is transmitted by the application for printing is performed, Toast including a message relating to the printing setting operation is displayed. Then, Toast such as this may be divided and displayed by the processing as shown in FIG. 11 being performed.

Second Embodiment

In the first embodiment, the example is described in which in a case where the number of characters that are displayed is large, Toast is divided and displayed. In the present embodiment, an example is described in which a new different threshold value is provided for the number of divided Toast displays and the display method is changed to another display method, such as display by the Dialog function. In the following explanation, contents different from those of the first embodiment are explained mainly. Explanation of the same contents as those of the first embodiment is omitted appropriately.

Figure 13:
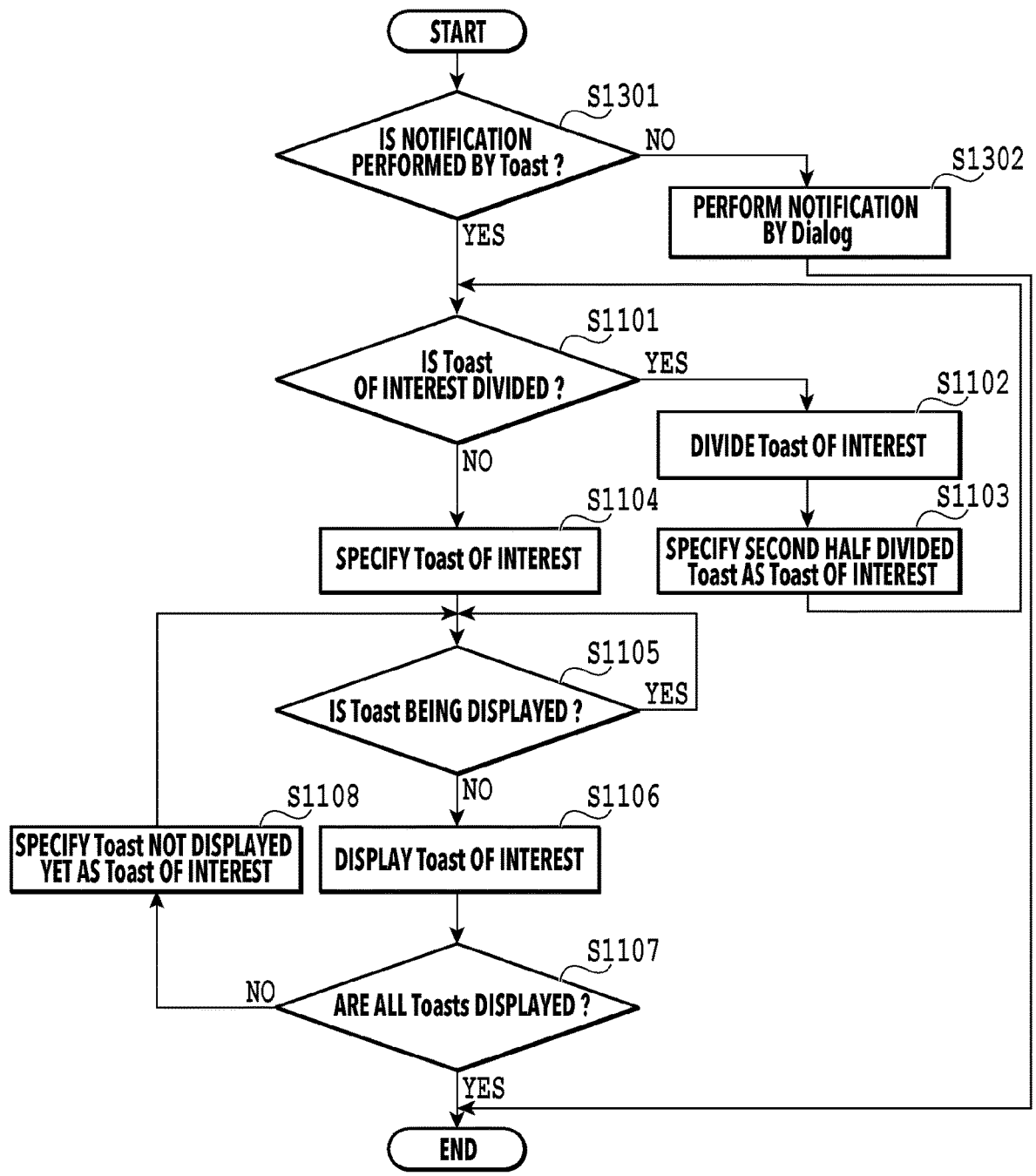
FIG. 13 is a flowchart of UI display processing in a second embodiment.

FIG. 13 is a flowchart showing processing according to the present embodiment. The flowchart in FIG. 13 is performed by the application for printing in a case where notification is performed by the Toast function and Toast that should be displayed by the Toast notification is specified by the application for printing. In the following processing, processing is performed for Toast determined to be Toast of interest, and at the time of start of this flowchart, Toast specified here is taken to be Toast of interest. To the same processing as that in the flowchart in FIG. 11, the step number shown in FIG. 11 is allocated.

At S1301, the CPU 103 determines whether or not to notify the message notified by Toast of interest by the Toast function. Specifically, the CPU 103 determines whether or not the number of line feed codes in the character string included in Toast of interest is larger than or equal to a specific threshold value. The specific threshold value is a value larger the predetermined threshold value used for the determination at S1101. Specifically, for example, the predetermined threshold value is taken to be 1 and the specific threshold value is taken to be 2. Due to this, it is possible for the CPU 103 to determine whether or not the number of divisions becomes large in a case where the number of divisions is determined by the determination at S1101. Then, in a case where the number of line feed codes in the character string included in Toast of interest is larger than or equal to the specific threshold value, the CPU 103 determines not to notify the message notified by Toast of interest by the Toast function and the processing advances to S1302. On the other hand, in a case where the number of line feed codes in the character string included in Toast of interest is less than the specific threshold value, the CPU 103 determines to notify the message notified by Toast of interest by the Toast function and the processing advances to S1101. The processing at S1101 and subsequent steps are the same as the contents explained in FIG. 11. This determination is performed based on the number of line feed codes, but the aspect is not limited to this. For example, it may also be possible to determine whether or not the number of characters included in the character string included in Toast of interest is larger than or equal to a specific threshold value and determine not to notify the message notified by Toast of interest by the Toast function in a case where the number of characters is larger than or equal to the specific threshold value. Alternatively, for example, it may also be possible to employ a value, as the value inherent in the character string, which is calculated based on the number of characters and the number of line feed codes, both included in the character string, determine whether or not the value inherent in the character string is larger than or equal to the specific threshold value, and then determine not to notify the message notified by Toast of interest by the Toast function in a case where the value inherent in the character string is larger than or equal to the specific threshold value.

At S1302, the CPU 103 notifies the message notified by Toast of interest by a notification function other than the Toast function. The notification function other than the Toast function is specifically, for example, the Dialog function. However, the aspect is not limited to this and the notification function other than the Toast function may be, for example, the Notification function and the SnackBar function. Further, by which notification function, notification is performed may be controlled in accordance with the contents of the message that is notified or the timing at which notification is performed. Specifically, for example, in a case where the contents of the message are those for receiving the confirmation operation from a user, control may be performed so that notification is performed by the Dialog function. Further, in a case where the timing at which notification is performed is the timing at which the application for printing is running in the background, control may be performed so that notification is performed by the Notification function. Then, in a case where the timing at which notification is performed is the timing at which the application for printing is running in the foreground, control may be performed so that notification is performed by the SnackBar function or the Dialog function. The number of characters that can be displayed at a time by each of the Notification function, the SnackBar function, and the Dialog function is larger than the number of characters that can be displayed at a time by the Toast function. Because of this, the message notified by Toast of interest is displayed at a time by the notification function other than the Toast function without being divided. In a case where the number of characters of the message notified by Toast of interest is large and exceeds the number of characters that can be displayed at a time by the Notification function and the SnackBar function, control may be performed so that notification is performed by the Dialog function. The reason is that Dialog has the function capable of controlling the display contents of a message by scroll, and therefore, there is substantially no limit to the number of characters than can be displayed at a time. After the processing at S1302, the processing of this flowchart is completed.

As explained above, in the present embodiment, a new different threshold value for the number of divided Toast displays is provided and based on the threshold value, whether or not to change the display method to another display method, such as the Dialog display, is determined. Consequently, according to the present embodiment, it is possible to improve the visual recognizability of a user, and therefore, it is possible to improve convenience by suppressing the erroneous operation of a user. Further, by preventing too many Toasts from being displayed, it is possible to prevent a reduction in UX.

Other Embodiments

As described previously, the function to display Toast is the function of the OS, and therefore, there is a case where the display specifications are different for different kinds or versions of OS. Specifically, for example, depending on the version of Android, there is a case where the number of characters that can be display at a time by the Toast function is different. It may also be possible to change the embodiments shown so far for each kind or version of OS. Specifically, for example, it may also be possible to determine the version of the information processing apparatus 101 before S1101 or before S1301. Then, in a case where the determined version is one whose number of characters that can be displayed at a time by the Toast function is large, it may also be possible to notify Toast of interest by the Toast function without dividing Toast of interest. Then, in a case where the determined version is one whose number of characters that can be displayed at a time by the Toast function is not large, it may also be possible for the processing to advance to S1101 or S1301. The version whose number of characters that can be displayed at a time by the Toast function is large is, for example, the version earlier than Android 12 (version earlier than a predetermined version). Further, the version whose number of characters that can be displayed at a time by the Toast function is small is, for example, Android 12 or a more recent version (version of a predetermined version or more recent version).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, even in a case where the number of displayed characters is large, it is made possible to provide UI display that secures the visual recognizability of a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-161331, filed Sep. 30, 2021, which is hereby incorporated by reference wherein in its entirety.

What is claimed is:

1. A control method of an information processing apparatus, the method comprising:
   a specification step of specifying notification contents; and
   a notification step of performing, based on at least one of a number of line feeds included in the specified notification contents and a number of characters included in the specified notification contents, processing for notifying the specified notification contents by a predetermined notification method, wherein
   the predetermined notification method is a notification method of displaying, after a first portion of the specified notification contents is displayed and the display of the first portion is terminated, a second portion different from the first portion of the specified notification contents.

2. The control method according to claim 1, wherein based on at least one of that the number of line feeds included in the specified notification contents is larger than or equal to a threshold value and that the number of characters included in the specified notification contents is larger than or equal to a threshold value, the processing for notifying the specified notification contents by the predetermined notification method is performed.

3. The control method according to claim 1, wherein the processing for notifying the specified notification contents by the predetermined notification method is processing to request an OS of the information processing apparatus to display the second portion after requesting the OS of the information processing apparatus to display the first portion.

4. The control method according to claim 1, wherein based on at least one of the number of line feeds included in the specified notification contents and the number of characters included in the specified notification contents, whether to perform the processing for notifying the specified notification contents by the predetermined notification method or processing for notifying the specified notification contents by a specific notification method different from the predetermined notification method is controlled and
the specific notification method is a notification method of displaying the specified notification contents without division.

5. The control method according to claim 4, wherein based on at least one of that the number of line feeds included in the specified notification contents is less than a threshold value and that the number of characters included in the specified notification contents is less than a threshold value, the processing for notifying the specified notification contents by the specific notification method is performed.

6. The control method according to claim 4, wherein processing for notifying the specified notification contents by the specific notification method is processing to request an OS of the information processing apparatus to display the entire specified notification contents.

7. The control method according to claim 1, wherein whether to perform the processing for notifying the specified notification contents by the predetermined notification method or processing for notifying the specified notification contents by a specific notification method different from the predetermined notification method is controlled based on a kind or version of OS of the information processing apparatus and
the specific notification method is a notification method of displaying the specified notification contents without division.

8. The control method according to claim 1, further comprising:
   a determination step of performing, based on at least one of the number of line feeds included in the specified notification contents and the number of characters included in the specified notification contents, determination processing to determine whether to perform the processing for notifying the specified notification contents by the predetermined notification method or processing for notifying the specified notification contents by a specific notification method different from the predetermined notification method, wherein
   whether to perform the processing for notifying the specified notification contents by the specific notification method without performing the determination processing or perform the processing for notifying the specified notification contents by the predetermined notification method or the processing for notifying the specified notification contents by the specific notification method different from the predetermined notification method based on results of the determination processing is controlled based on a kind or version of OS of the information processing apparatus and
   the specific notification method is a notification method of displaying the specified notification contents without division.

9. The control method according to claim 8, wherein in a case where the OS of the information processing apparatus is a version earlier than a predetermined version, the processing for notifying the specified notification contents by the specific notification method is performed without performing the determination processing and
in a case where the OS of the information processing apparatus is the predetermined version or a more recent version, the processing for notifying the specified notification contents by the predetermined notification method or the processing for notifying the specified notification contents by the specific notification method different from the predetermined notification method is performed based on the results of the determination processing.

10. The control method according to claim 9, wherein the predetermined version is Android 12.

11. The control method according to claim 1, wherein the notification contents are displayed in Toast.

12. The control method according to claim 1, wherein based on at least one of the number of line feeds included in the specified notification contents and the number of characters included in the specified notification contents, whether the notification contents are displayed by a Toast function or the notification contents are displayed by a function different from the Toast function is controlled.

13. The control method according to claim 12, wherein the other function that is used for display of the notification contents is one of a Dialog function, a Notification function, and a SnackBar function.

14. The control method according to claim 13, wherein in a case where a program, that performs the processing for notifying the specified notification contents, is running in a background, the other function that is used for display of the notification contents is the Notification function and in a case where the program is running in a foreground, the other function that is used for display of the notification contents is the Dialog function or the SnackBar function.

15. The control method according to claim 13, wherein in a case where control is performed so that the notification contents are displayed by the other function and the number of characters included in the specified notification contents exceeds a number of characters that can be displayed at a time by the Notification function or a number of characters that can be displayed at a time by the SnackBar function, the other function that is used for display of the notification contents is the Dialog function.

16. The control method according to claim 1, wherein based on at least one of that the number of line feeds included in the specified notification contents is larger than or equal to a first threshold value and that the number of characters included in the specified notification contents is larger than or equal to a second threshold value, control is performed so that the notification contents are displayed by another function different from the Toast function and based on at least one of that the number of line feeds included in the specified notification contents is less than the first threshold value and that the number of characters included in the specified notification contents is less than the second threshold value, control is performed so that the notification contents are displayed by the Toast function.

17. The control method according to claim 16, wherein in a case where control is performed so that the notification contents are displayed by the Toast function, based on at least one of that the number of line feeds included in the specified notification contents is larger than or equal to a third threshold value smaller than the first threshold value and that the number of characters included in the specified notification contents is larger than or equal to a fourth threshold value smaller than the second threshold value, the processing for notifying the specified notification contents by the predetermined notification method is performed, in a case where control is performed so that the notification contents are displayed by the Toast function, based on at least one of that the number of line feeds included in the specified notification contents is less than the third threshold value and that the number of characters included in the specified notification contents is less than the fourth threshold value, processing for notifying the specified notification contents by a specific notification method different from the predetermined notification method is performed, and the specific notification method is a notification method of displaying the specified notification contents without division.

18. The control method according to claim 1, further comprising:
a transmission step of transmitting at least one of a print job for causing a communication device to perform printing and a scan job for causing the communication device to perform scanning to the communication device.

19. A non-transitory computer readable storage medium storing a program for causing a computer of an information processing apparatus to perform:
a specification step of specifying notification contents; and
a notification step of performing, based on at least one of a number of line feeds included in the specified notification contents and a number of characters included in the specified notification contents, processing for notifying the specified notification contents by a predetermined notification method, wherein
the predetermined notification method is a notification method of displaying, after a first portion of the specified notification contents is displayed and the display of the first portion is terminated, a second portion different from the first portion of the specified notification contents.

20. An information processing apparatus comprising:
a specifying unit configured to specify notification contents; and
a notification unit configured to perform, based on at least one of a number of line feeds included in the specified notification contents and a number of characters included in the specified notification contents, processing for notifying the specified notification contents by a predetermined notification method, wherein
the predetermined notification method is a notification method of displaying, after a first portion of the specified notification contents is displayed and the display of the first portion is terminated, a second portion different from the first portion of the specified notification contents.

* * * * *